United States Patent
Vajapeyam et al.

(10) Patent No.: US 9,961,718 B2
(45) Date of Patent: May 1, 2018

(54) DISCONTINUOUS RECEPTION IN LTE/LTE-A NETWORKS INCLUDING CONTENTION-BASED FREQUENCY SPECTRUM

(71) Applicant: QUALCOMM Incorporated, San Diego, CA (US)

(72) Inventors: Madhavan Srinivasan Vajapeyam, San Diego, CA (US); Aleksandar Damnjanovic, Del Mar, CA (US); Tao Luo, San Diego, CA (US); Hao Xu, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/064,383

(22) Filed: Mar. 8, 2016

(65) Prior Publication Data

US 2016/0286603 A1    Sep. 29, 2016

Related U.S. Application Data

(60) Provisional application No. 62/139,212, filed on Mar. 27, 2015.

(51) Int. Cl.
*H04W 4/00* (2009.01)
*H04W 76/04* (2009.01)
(Continued)

(52) U.S. Cl.
CPC ..... *H04W 76/048* (2013.01); *H04W 52/0216* (2013.01); *H04W 52/0219* (2013.01);
(Continued)

(58) Field of Classification Search
None
See application file for complete search history.

(56) References Cited

U.S. PATENT DOCUMENTS

| 2011/0002281 A1 | 1/2011 | Terry et al. |
| 2011/0267957 A1 | 11/2011 | Du et al. |

(Continued)

FOREIGN PATENT DOCUMENTS

WO    WO-2014165712 A1    10/2014

OTHER PUBLICATIONS

International Search Report and Written Opinion—PCT/US2016/021564—ISA/EPO—Aug. 16, 2016.

*Primary Examiner* — Rebecca E Song
(74) *Attorney, Agent, or Firm* — Norton Rose Fulbright US LLP

(57) ABSTRACT

Enhanced discontinuous reception (DRX) techniques are discussed for networks configured with some combination of contention-based spectrum. Various aspects provide common or separate DRX configurations across all carriers and cells. Durations may be adjusted to increase the probability of a user equipment (UE) remaining active for the base station to secure the shared channel. Physical layer commands may also be transmitted for UE to enter sleep mode dynamically in order to further save power. Additional triggering signals sent via the physical layer or layer 1 signaling, such as fast wake-up signals or fast sleep signals, may either wake the UE for monitoring the contention-based spectrum of the secondary carrier or cause the UE to enter a sleep mode after monitoring is over. Further aspects provide to initiate DRX procedures in contention-based spectrum in response to detected CUBS or other channel usage signals.

24 Claims, 17 Drawing Sheets

(51) Int. Cl.
*H04W 74/08* (2009.01)
*H04W 72/04* (2009.01)
*H04W 52/02* (2009.01)

(52) U.S. Cl.
CPC ..... *H04W 72/042* (2013.01); *H04W 72/0453* (2013.01); *H04W 74/08* (2013.01); *H04W 76/046* (2013.01); *Y02B 60/50* (2013.01)

(56) References Cited

U.S. PATENT DOCUMENTS

| | | |
|---|---|---|
| 2011/0292854 A1 | 12/2011 | Terry et al. |
| 2013/0114484 A1* | 5/2013 | Suzuki ................ H04W 68/025 370/311 |
| 2013/0294307 A1 | 11/2013 | Johansson et al. |
| 2016/0066325 A1* | 3/2016 | Kim ................ H04W 74/0816 370/329 |
| 2016/0073344 A1* | 3/2016 | Vutukuri ........... H04W 52/0216 370/252 |
| 2016/0219475 A1* | 7/2016 | Kim ................... H04W 76/025 |
| 2016/0270146 A1* | 9/2016 | Feuersaenger .... H04W 52/0225 |
| 2016/0337968 A1* | 11/2016 | Park ................. H04W 52/0235 |
| 2017/0238311 A1* | 8/2017 | Hooli ................ H04W 72/0446 370/329 |

* cited by examiner

DISCONTINUOUS RECEPTION IN LTE/LTE-A NETWORKS INCLUDING CONTENTION-BASED FREQUENCY SPECTRUM

CROSS-REFERENCE TO RELATED APPLICATIONS

This application claims the benefit of U.S. Provisional Patent Application No. 62/139,212, entitled, "DISCONTINUOUS RECEPTION IN LTE/LTE-A NETWORKS INCLUDING CONTENTION-BASED FREQUENCY SPECTRUM," filed on Mar. 27, 2015, which is expressly incorporated by reference herein in its entirety.

BACKGROUND

Field

Aspects of the present disclosure relate generally to wireless communication systems, and more particularly, to discontinuous reception (DRX) in long term evolution (LTE)/LTE-Advanced (LTE-A) networks including contention-based frequency spectrum.

Background

Wireless communication systems are widely deployed to provide various types of communication content, such as voice, video, packet data, messaging, broadcast, or the like. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a clear channel assessment (CCA) procedure to determine whether a channel of the contention-based shared radio frequency spectrum band is available. When it is determined that the channel of the contention-based shared radio frequency spectrum band is available, a channel reserving or usage signal, such as a channel usage beacon signal (CUBS) may be transmitted to reserve the channel.

SUMMARY

Discontinuous reception (DRX) provides a process for a UE to save power by periodically entering a sleep mode and periodically waking to listen for control channels. For networks configured with some combination of contention-based spectrum, variations to existing DRX procedures may be implemented. Certain aspects provide a common DRX across all carriers and cells. Durations may be increased in order to increase the probability of a UE being active long enough for the base station to secure the channel. DRX commands may also cause the UE to enter sleep mode dynamically in order to save power. Additional aspects provide for a separate DRX configuration to be applied to each primary and secondary cells. Additional triggering signals, such as fast wake-up signals or fast sleep signals may either wake the UE for monitoring the contention-based spectrum of the secondary carrier or cause the UE to enter a sleep mode after monitoring is over. Further aspects provide techniques to initiate DRX procedures in contention-based spectrum in response to detected CUBS or other channel usage signals.

In an aspect, a method of wireless communication includes monitoring, by a UE, a primary carrier during a first active time duration, wherein the first active time duration is based at least in part on one or more DRX timers, and the primary carrier is a non-contention-based carrier, monitoring, by the UE, a secondary carrier during a second active time duration, wherein the second active time duration is based on the first active time duration, and the secondary carrier is a contention-based carrier, receiving a DRX command on a physical layer channel, and entering a sleep mode on the secondary carrier at the UE in response to the DRX command.

In another aspect, a method of wireless communication includes receiving, at a UE, configuration signals identifying a first DRX cycle length, a first DRX offset, and a first DRX on-duration for a primary cell with non-contention-based spectrum, and a second DRX cycle length, a second DRX offset, and a second DRX on-duration for a secondary cell with contention-based shared spectrum, wherein the first DRX cycle length, the first DRX offset, the second DRX cycle length, and the second DRX offset ensure at least partial overlap between the UE's first DRX on-duration and the secondary DRX on-duration, and monitoring, by the UE, the primary cell during a first on-duration timer set to the first DRX on-duration and the secondary cell during a second on-duration timer set to the second DRX on-duration.

In another aspect, a method of wireless communication includes monitoring, by a UE, for a channel usage signal from a serving base station on contention-based shared spectrum, initiating, in response to detecting the channel usage signal, monitoring for a downlink control channel on the contention-based shared spectrum during an on-duration based on a configured on-duration timer, and entering a sleep mode on expiration of one or: an inactivity timer, or the configured on-duration timer, wherein the inactivity timer is initiated in response to detecting the downlink control channel.

In an additional aspect of the disclosure, an apparatus configured for wireless communication includes means for monitoring, by a UE, a primary carrier during a first active time duration, wherein the first active time duration is based at least in part on one or more DRX timers, and the primary carrier is a non-contention-based carrier, means for monitoring, by the UE, a secondary carrier during a second active time duration, wherein the second active time duration is based on the first active time duration, and the secondary carrier is a contention-based carrier, means for receiving a DRX command on a physical layer channel, and means for entering a sleep mode on the secondary carrier at the UE in response to the DRX command.

In an additional aspect of the disclosure, an apparatus configured for wireless communication includes means for receiving, at a UE, configuration signals identifying a first DRX cycle length, a first DRX offset, and a first DRX on-duration for a primary cell with non-contention-based spectrum, and a second DRX cycle length, a second DRX offset, and a second DRX on-duration for a secondary cell with contention-based shared spectrum, wherein the first DRX cycle length, the first DRX offset, the second DRX cycle length, and the second DRX offset ensure at least partial overlap between the UE's first DRX on-duration and the secondary DRX on-duration, and means for monitoring, by the UE, the primary cell during a first on-duration timer set to the first DRX on-duration and the secondary cell during a second on-duration timer set to the second DRX on-duration.

In an additional aspect of the disclosure, an apparatus configured for wireless communication includes means for monitoring, by a UE, for a channel usage signal from a serving base station on contention-based shared spectrum, means for initiating, in response to detecting the channel usage signal, monitoring for a downlink control channel on the contention-based shared spectrum during an on-duration based on a configured on-duration timer, and means for entering a sleep mode on expiration of one or: an inactivity timer, or the configured on-duration timer, wherein the inactivity timer is initiated in response to detecting the downlink control channel.

In an additional aspect of the disclosure, a computer program product has a computer-readable medium having program code recorded thereon. This program code includes code to monitor, by a UE, a primary carrier during a first active time duration, wherein the first active time duration is based at least in part on one or more DRX timers, and the primary carrier is a non-contention-based carrier, code to monitor, by the UE, a secondary carrier during a second active time duration, wherein the second active time duration is based on the first active time duration, and the secondary carrier is a contention-based carrier, code to receive a DRX command on a physical layer channel, and code to enter a sleep mode on the secondary carrier at the UE in response to the DRX command.

In an additional aspect of the disclosure, a computer program product has a computer-readable medium having program code recorded thereon. This program code includes code to receive, at a UE, configuration signals identifying a first DRX cycle length, a first DRX offset, and a first DRX on-duration for a primary cell with non-contention-based spectrum, and a second DRX cycle length, a second DRX offset, and a second DRX on-duration for a secondary cell with contention-based shared spectrum, wherein the first DRX cycle length, the first DRX offset, the second DRX cycle length, and the second DRX offset ensure at least partial overlap between the UE's first DRX on-duration and the secondary DRX on-duration, and code to monitor, by the UE, the primary cell during a first on-duration timer set to the first DRX on-duration and the secondary cell during a second on-duration timer set to the second DRX on-duration.

In an additional aspect of the disclosure, a computer program product has a computer-readable medium having program code recorded thereon. This program code includes code to monitor, by a UE, for a channel usage signal from a serving base station on contention-based shared spectrum, code to initiate, in response to detecting the channel usage signal, monitoring for a downlink control channel on the contention-based shared spectrum during an on-duration based on a configured on-duration timer, and code to enter a sleep mode on expiration of one or: an inactivity timer, or the configured on-duration timer, wherein the inactivity timer is initiated in response to detecting the downlink control channel.

In an additional aspect of the disclosure, an apparatus includes at least one processor and a memory coupled to the processor. The processor is configured to monitor, by a UE, a primary carrier during a first active time duration, wherein the first active time duration is based at least in part on one or more DRX timers, and the primary carrier is a non-contention-based carrier, to monitor, by the UE, a secondary carrier during a second active time duration, wherein the second active time duration is based on the first active time duration, and the secondary carrier is a contention-based carrier, to receive a DRX command on a physical layer channel, and to enter a sleep mode on the secondary carrier at the UE in response to the DRX command.

In an additional aspect of the disclosure, an apparatus includes at least one processor and a memory coupled to the processor. The processor is configured to receive, at a UE, configuration signals identifying a first DRX cycle length, a first DRX offset, and a first DRX on-duration for a primary cell with non-contention-based spectrum, and a second DRX cycle length, a second DRX offset, and a second DRX on-duration for a secondary cell with contention-based shared spectrum, wherein the first DRX cycle length, the first DRX offset, the second DRX cycle length, and the second DRX offset ensure at least partial overlap between the UE's first DRX on-duration and the secondary DRX on-duration, and to monitor, by the UE, the primary cell during a first on-duration timer set to the first DRX on-duration and the secondary cell during a second on-duration timer set to the second DRX on-duration.

In an additional aspect of the disclosure, an apparatus includes at least one processor and a memory coupled to the processor. The processor is configured to monitor, by a UE, for a channel usage signal from a serving base station on contention-based shared spectrum, to initiate, in response to detecting the channel usage signal, monitoring for a downlink control channel on the contention-based shared spectrum during an on-duration based on a configured on-duration timer, and to enter a sleep mode on expiration of one or: an inactivity timer, or the configured on-duration timer, wherein the inactivity timer is initiated in response to detecting the downlink control channel.

In another aspect, a method of wireless communication includes monitoring for a channel usage signal, by a UE, from a serving base station on contention-based shared spectrum, monitoring for a downlink control channel on the contention-based shared spectrum during an on-duration based on a configured on-duration timer, when the channel usage signal is detected, and entering a sleep mode on expiration of either an inactivity timer, wherein the inactivity timer is initiated in response to detecting the downlink control channel, or the configured on-duration timer.

In another aspect, a method of wireless communication includes receiving a control signal on a physical layer channel from a primary carrier, and managing one or more timers for the primary carrier and a secondary carrier using the control signal, wherein the one or more timers are associated with either an on-duration of the primary and secondary carriers, or entry into a sleep mode of the primary or secondary carriers, wherein the secondary carrier communicates using a contention-based carrier.

In an additional aspect of the disclosure, an apparatus includes at least one processor and a memory coupled to the processor. The processor is configured to monitor for a channel usage signal, by a UE, from a serving base station on contention-based shared spectrum, to monitor for a downlink control channel on the contention-based shared spectrum during an on-duration based on a configured on-duration timer, when the channel usage signal is detected, and to enter a sleep mode on expiration of either an inactivity timer, wherein the inactivity timer is initiated in response to detecting the downlink control channel, or the configured on-duration timer.

In an additional aspect of the disclosure, an apparatus includes at least one processor and a memory coupled to the processor. The processor is configured to receive a control signal on a physical layer channel from a primary carrier, and to manage one or more timers for the primary carrier and a secondary carrier using the control signal, wherein the one or more timers are associated with either an on-duration of the primary and secondary carriers, or entry into a sleep mode of the primary or secondary carriers, wherein the secondary carrier communicates using a contention-based carrier.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
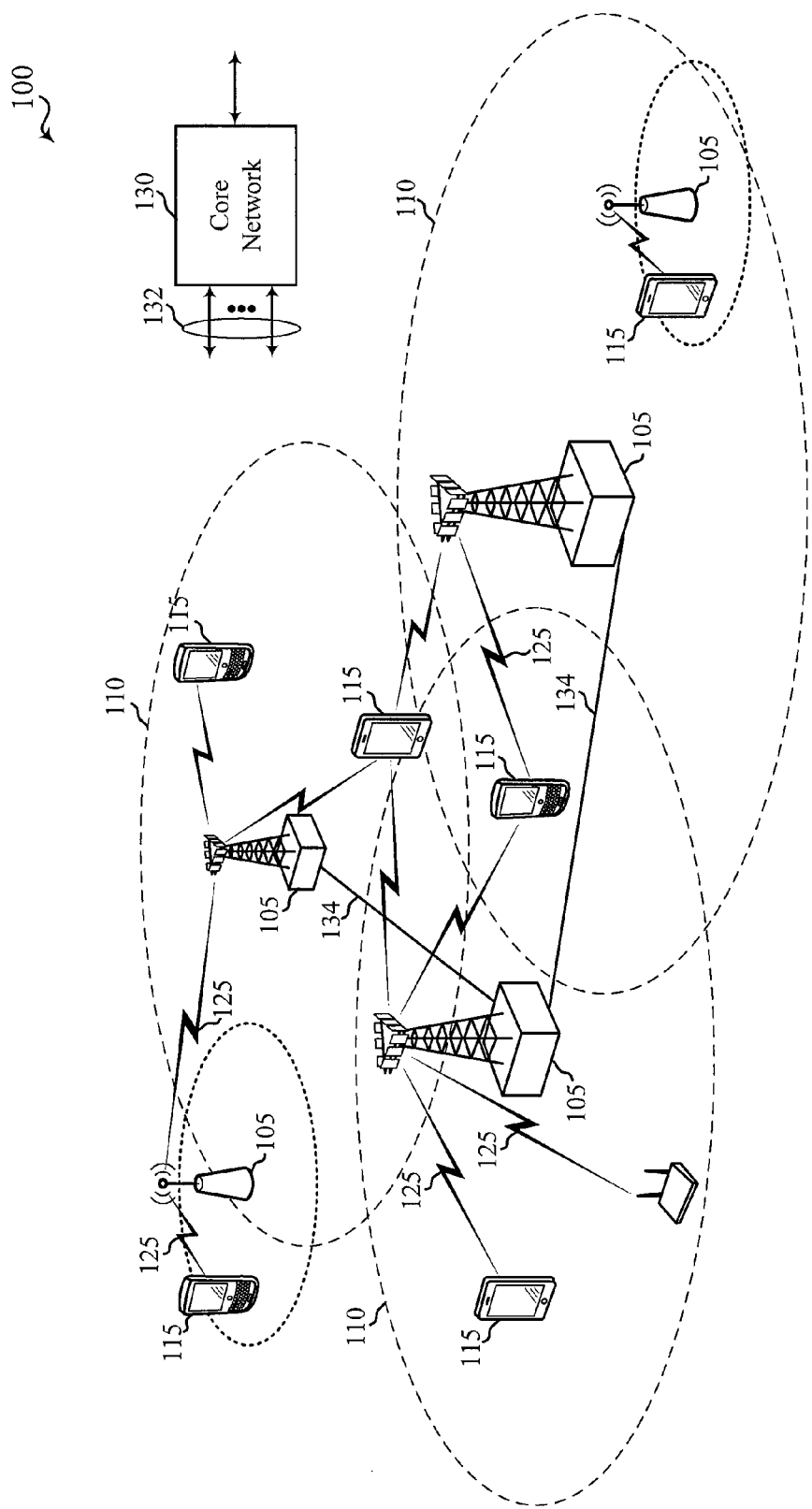
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Techniques are described in which an unlicensed radio frequency spectrum band is used for at least a portion of contention-based communications over a wireless communication system. In some examples, a contention-based shared radio frequency spectrum band may be used for Long Term Evolution (LTE) communications or LTE-Advanced (LTE-A) communications. The contention-based radio frequency spectrum band may be used in combination with, or independent from, a non-contention licensed radio frequency spectrum band. In some examples, the contention-based radio frequency spectrum band may be a radio frequency spectrum band for which a device may also need to contend for access because the radio frequency spectrum band is available, at least in part, for unlicensed use, such as WiFi use.

With increasing data traffic in cellular networks that use a licensed radio frequency spectrum band, offloading of at least some data traffic to a contention-based shared radio frequency spectrum band, such as in an unlicensed band, may provide a cellular operator (e.g., an operator of a public land mobile network (PLMN) or a coordinated set of base stations defining a cellular network, such as an LTE/LTE-A network) with opportunities for enhanced data transmission capacity. As noted above, before communicating over a contention-based shared radio frequency spectrum band, such as unlicensed spectrum, devices may perform an LBT procedure to gain access to the shared radio frequency spectrum band. Such an LBT procedure may include performing a CCA procedure (or an extended CCA procedure) to determine whether a channel of the unlicensed radio frequency spectrum band is available. When it is determined that the channel of the contention-based radio frequency spectrum band is available, a channel usage signal (e.g., a CUBS) may be transmitted to reserve the channel. When it is determined that a channel is not available, a CCA procedure (or extended CCA procedure) may be performed for the channel again at a later time.

When a base station and/or a UE includes multiple antenna ports capable of transmitting over the contention-based shared radio frequency spectrum band, transmissions from different antenna ports may interfere with one another due to correlation between transmitted signals. For a channel usage signal used to reserve a channel of a contention-based shared radio frequency spectrum band, reduction of interference due to correlation between transmitted signals may be important to provide good detection capabilities for reserving the channel, and to prevent false detection that would unnecessarily reserve the channel and prevent other devices from using the channel. To reduce such interference due to cross-correlation of signals from different antennas or auto-correlation of a signal from a single antenna, the base station or the UE may generate a sequence based at least in part on an antenna port identifier associated with an antenna port that transmits the sequence of the channel usage signal. In this way, correlation of channel usage signals may be reduced, thereby improving detection capabilities of the signal transmission, resulting in more effective and accurate reservations of a channel of the contention-based shared radio frequency spectrum band.

In other words, for a channel usage signal used to reserve a channel of an unlicensed radio frequency spectrum band, the channel usage signal should be configured with good detectability to reduce false alarms, so that the channel reservation may be easily detected by other devices trying to access the shared radio frequency spectrum band. Thus, in order to be easily detectable with a low probability of false alarm, a channel usage signal sequence should have good auto-correlation properties with itself and good cross-correlation properties with sequences from neighbor base stations. For example, a primary synchronization signal (PSS), a secondary synchronization signal (SSS), and/or a channel state information-reference signal (CSI-RS) may not have good auto-correlation properties or good cross-correlation properties between different base stations in the contention-based shared radio frequency spectrum band. As such PSS, SSS, and CSI-RS may not be easily detectable, which, if such signals were used as a channel usage signal, could increase the number of false alarms and lower detection rate, which may increase collisions or delay transmissions when a transmitter falsely detects a channel usage signal. Thus, the channel usage signal sequence should be configured based at least in part on an antenna port identifier to provide good auto-correlation and cross-correlation properties.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is an illustration of an example wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with other base stations 105 over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers):

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. Uplink transmissions may also include transmissions of data, which data may be transmitted over a physical uplink shared channel (PUSCH) or enhanced PUSCH (ePUSCH). Uplink transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIGS. 2A and 2B), or a scheduling request (SR) or enhanced SR (eSR) (e.g., in the standalone mode described with reference to FIGS. 2A and 2B). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a non-contention licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a contention-based shared radio frequency spectrum band (e.g., an unlicensed radio frequency spectrum band for which transmitting apparatuses may need to contend for access because the radio frequency spectrum band is available for unlicensed use, such as WiFi use). Upon winning a contention for access to the contention-based shared radio frequency spectrum band, a transmitting apparatus (e.g., a base station 105 or UE 115) may transmit one or more channel usage signals (e.g., one or more CUBS) over the unlicensed radio frequency spectrum band. The channel usage signals may serve to reserve the unlicensed radio frequency spectrum by providing a detectable energy on the unlicensed radio frequency spectrum band. The channel usage signals may also serve to identify a transmitting apparatus and/or a transmitting antenna, or may serve to synchronize the transmitting apparatus and a receiving apparatus. In some examples, a channel usage signal transmission may commence at a symbol period boundary (e.g., an OFDM symbol period boundary). In other examples, a CUBS transmission may commence between symbol period boundaries.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2A:
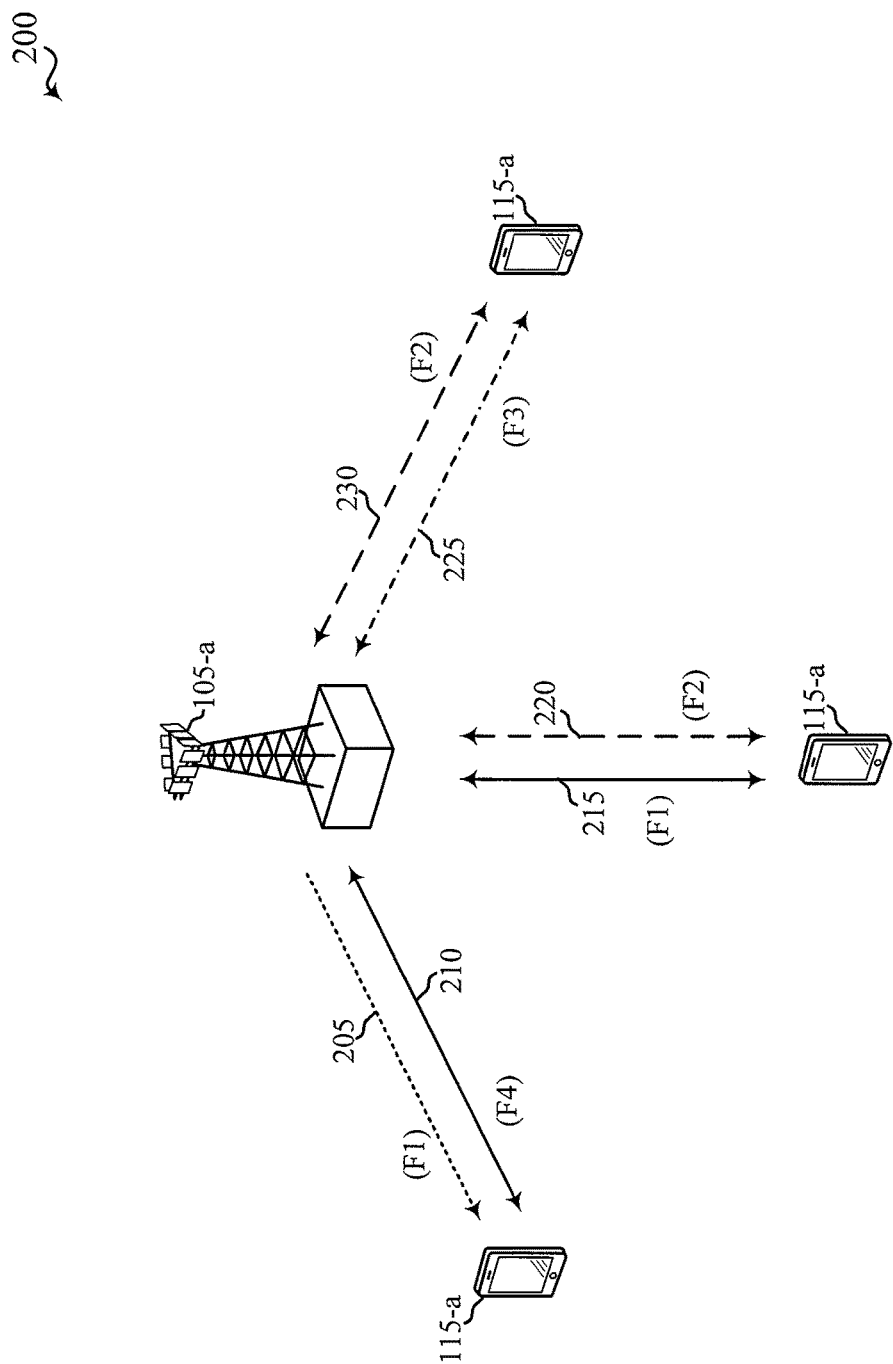
FIG. 2A shows a diagram that illustrates examples of deployment scenarios for using LTE in an unlicensed spectrum according to various embodiments.

Turning next to FIG. 2A, a diagram 200 shows examples of a supplemental downlink mode (e.g., licensed assisted access (LAA) mode) and of a carrier aggregation mode for an LTE network that supports LTE/LTE-A extended to contention-based shared spectrum. The diagram 200 may be an example of portions of the system 100 of FIG. 1. Moreover, the base station 105-*a* may be an example of the base stations 105 of FIG. 1, while the UEs 115-*a* may be examples of the UEs 115 of FIG. 1.

In the example of a supplemental downlink mode (e.g., LAA mode) in diagram 200, the base station 105-*a* may transmit OFDMA communications signals to a UE 115-*a* using a downlink 205. The downlink 205 is associated with a frequency F1 in an unlicensed spectrum. The base station 105-*a* may transmit OFDMA communications signals to the same UE 115-*a* using a bidirectional link 210 and may receive SC-FDMA communications signals from that UE 115-*a* using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-*a*. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-*a* may transmit OFDMA communications signals to a UE 115-*a* using a bidirectional link 215 and may receive SC-FDMA communications signals from the same UE 115-*a* using the bidirectional link 215. The bidirectional link 215 is associated with the frequency F1 in the unlicensed spectrum. The base station 105-*a* may also transmit OFDMA communications signals to the same UE 115-*a* using a bidirectional link 220 and may receive SC-FDMA communications signals from the same UE 115-*a* using the bidirectional link 220. The bidirectional link 220 is associated with a frequency F2 in a licensed spectrum. The bidirectional link 215 may provide a downlink and uplink capacity offload for the base station 105-*a*. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit OFDMA communications signals to a UE 115-*a* using a bidirectional link 225 and may receive SC-FDMA communications signals from the same UE 115-*a* using the bidirectional link 225. The bidirectional link 225 is associated with the frequency F3 in an unlicensed spectrum. The base station 105-*a* may also transmit OFDMA communications signals to the same UE 115-*a* using a bidirectional link 230 and may receive SC-FDMA communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with or without contention-based shared spectrum for capacity offload.

As described above, the typical service provider that may benefit from the capacity offload offered by using LTE/LTE-A extended to contention-based spectrum is a traditional MNO with LTE spectrum. For these service providers, an operational configuration may include a bootstrapped mode (e.g., supplemental downlink (e.g., LAA mode), carrier aggregation) that uses the LTE primary component carrier (PCC) on the non-contention spectrum and the LTE secondary component carrier (SCC) on the contention-based spectrum.

In the supplemental downlink mode, control for LTE/LTE-A extended to contention-based spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in an unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A extended to contention-based shared spectrum (e.g., bidirectional links 215 and 225). The carrier aggregation mechanisms supported when using LTE/LTE-A extended to contention-based shared spectrum may fall under a hybrid frequency division duplexing-time division duplexing (FDD-TDD) carrier aggregation or a TDD-TDD carrier aggregation with different symmetry across component carriers.

Figure 2B:
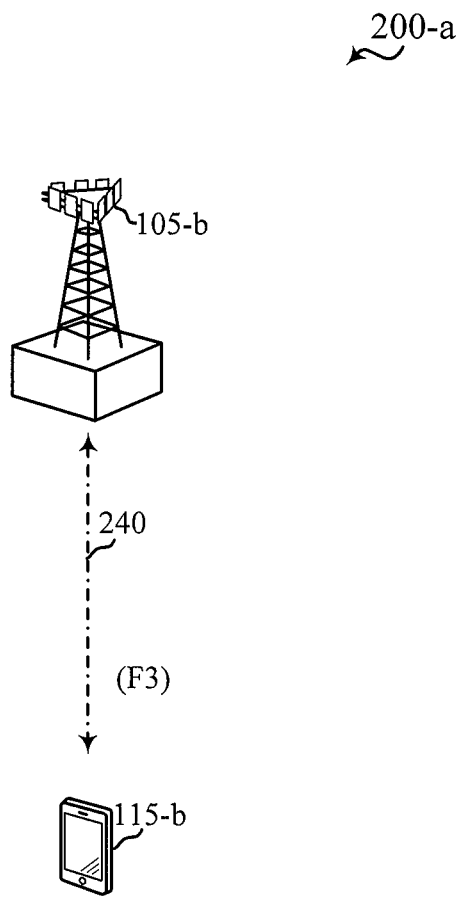
FIG. 2B shows a diagram that illustrates another example of a deployment scenario for using LTE in an unlicensed spectrum according to various embodiments.

FIG. 2B shows a diagram 200-*a* that illustrates an example of a standalone mode for LTE/LTE-A extended to contention-based shared spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-*a*, the base station 105-*b* may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in a contention-based shared spectrum described above with reference to FIG. 2A. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not have licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 105 or 105-*a* described with reference to FIG. 1, 2A, or 2B, or one of the UEs 115, 115-*a*, or 115-*b* described with reference to FIG. 1, 2A, or 2B, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

The number and arrangement of components shown in FIGS. 2A and 2B are provided as an example. In practice, wireless communication system 200 may include additional devices, fewer devices, different devices, or differently arranged devices than those shown in FIGS. 2A and 2B.

Figure 3:
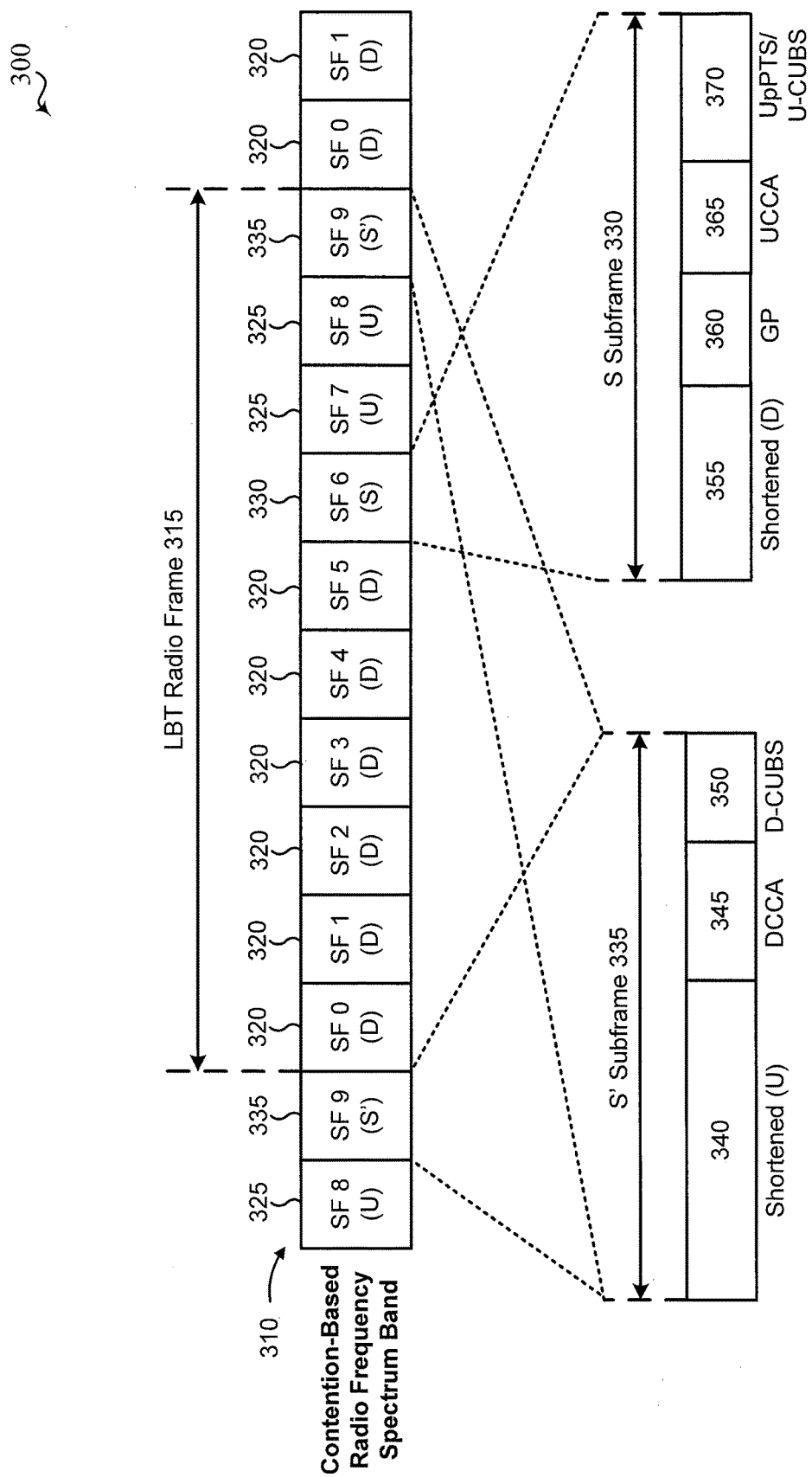
FIG. 3 shows a diagram that illustrates an example of carrier aggregation when using LTE concurrently in licensed and unlicensed spectrum according to various embodiments.

FIG. 3 is an illustration of an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (CCA) procedure 345 may be performed by one or more base stations, such as one or more of the base stations 105, 205, or 205-*a* described with reference to FIG. 1 or 2, to reserve, for a period of time, a channel of the contention-based shared radio frequency spectrum band over which the wireless communication 310 occurs. Following a successful downlink CCA procedure 345 by a base station, the base station may transmit a preamble, such as a channel usage beacon signal (CUBS) (e.g., a downlink CUBS (D-CUBS 350)) to provide an indication to other base stations or apparatuses (e.g., UEs, WiFi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the contention-based shared radio frequency spectrum band and satisfy one or more regulatory requirements (e.g., a requirement that transmissions over an unlicensed radio frequency spectrum band occupy at least 80% of the available frequency bandwidth). The D-CUBS 350 may in some examples take a form similar to that of an LTE/LTE-A cell-specific reference signal (CRS) or a channel state information reference signal (CSI-RS). When the downlink CCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period 340. A second portion of the S' subframe 335 may be used for the downlink CCA procedure 345. A third portion of the S' subframe 335 may be used by one or more base stations that successfully contend for access to the channel of the contention-based shared radio frequency spectrum band to transmit the D-CUBS 350.

During the S subframe 330, an uplink CCA procedure 365 may be performed by one or more UEs, such as one or more of the UEs 115, 215, 215-*a*, 215-*b*, or 215-*c* described above with reference to FIG. 1, 2A, or 2B, to reserve, for a period of time, the channel over which the wireless communication 310 occurs. Following a successful uplink CCA procedure 365 by a UE, the UE may transmit a preamble, such as an uplink CUBS (U-CUBS 370) to provide an indication to other UEs or apparatuses (e.g., base stations, WiFi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the contention-based radio frequency spectrum band and satisfy one or more regulatory requirements (e.g., the requirement that transmissions over the contention-based radio frequency spectrum band occupy at least 80% of the available frequency bandwidth). The U-CUBS 370 may in some examples take a form similar to that of an LTE/LTE-A CRS or CSI-RS. When the uplink CCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the uplink CCA procedure 365. A fourth portion of the S subframe 330 may be used by one or more UEs that successfully contend for access to the channel of the contention-based radio frequency spectrum band as an uplink pilot time slot (UpPTS) or to transmit the U-CUBS 370.

In some examples, the downlink CCA procedure 345 or the uplink CCA procedure 365 may include the performance of a single CCA procedure. In other examples, the downlink CCA procedure 345 or the uplink CCA procedure 365 may include the performance of an extended CCA procedure. The extended CCA procedure may include a random number of CCA procedures, and in some examples may include a plurality of CCA procedures.

As indicated above, FIG. 3 is provided as an example. Other examples are possible and may differ from what was described in connection with FIG. 3.

Figure 4:
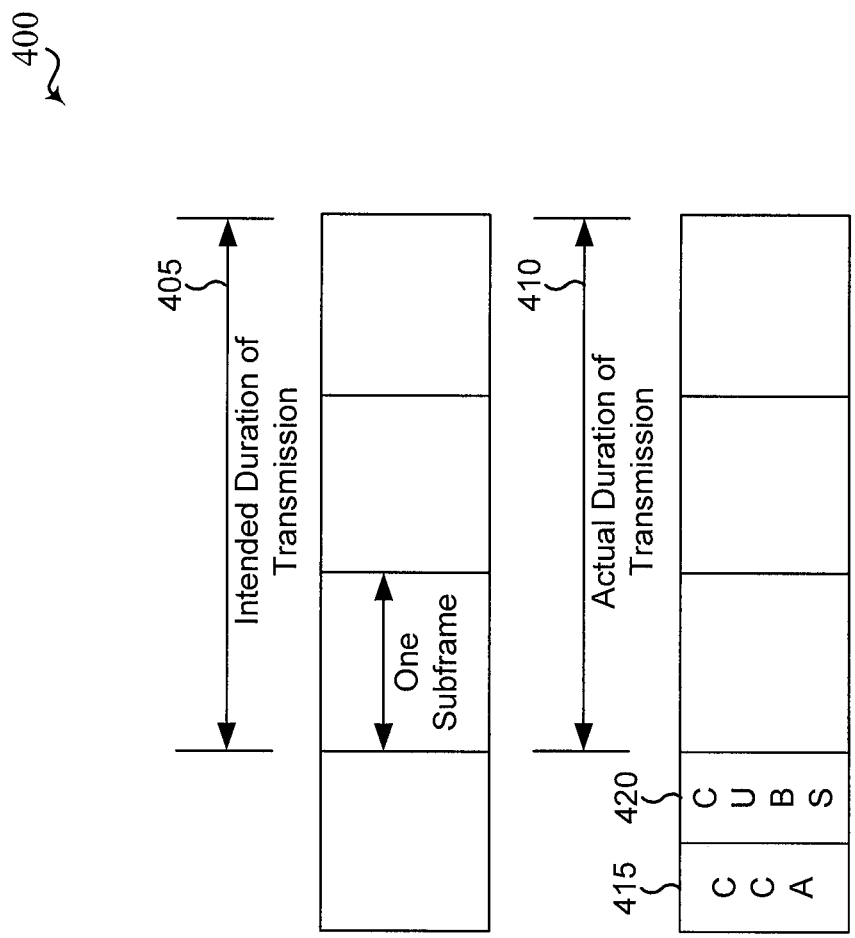
FIG. 4 is a block diagram conceptually illustrating a design of a base station/eNB and a UE configured according to one aspect of the present disclosure.

FIG. 4 is an illustration of an example 400 of a CCA procedure 415 performed by a transmitting apparatus when contending for access to a contention-based shared radio frequency spectrum band, in accordance with various aspects of the present disclosure. In some examples, the CCA procedure 415 may be an example of the downlink CCA procedure 345 or uplink CCA procedure 365 described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a channel usage signal, such as a CUBS 420, may be transmitted, followed by a data transmission (e.g., an uplink transmission or a downlink transmission). By way of example, the data transmission may have an intended duration 405 of three subframes and an actual duration 410 of three subframes.

As indicated above, FIG. 4 is provided as an example. Other examples are possible and may differ from what was described in connection with FIG. 4.

Figure 5:
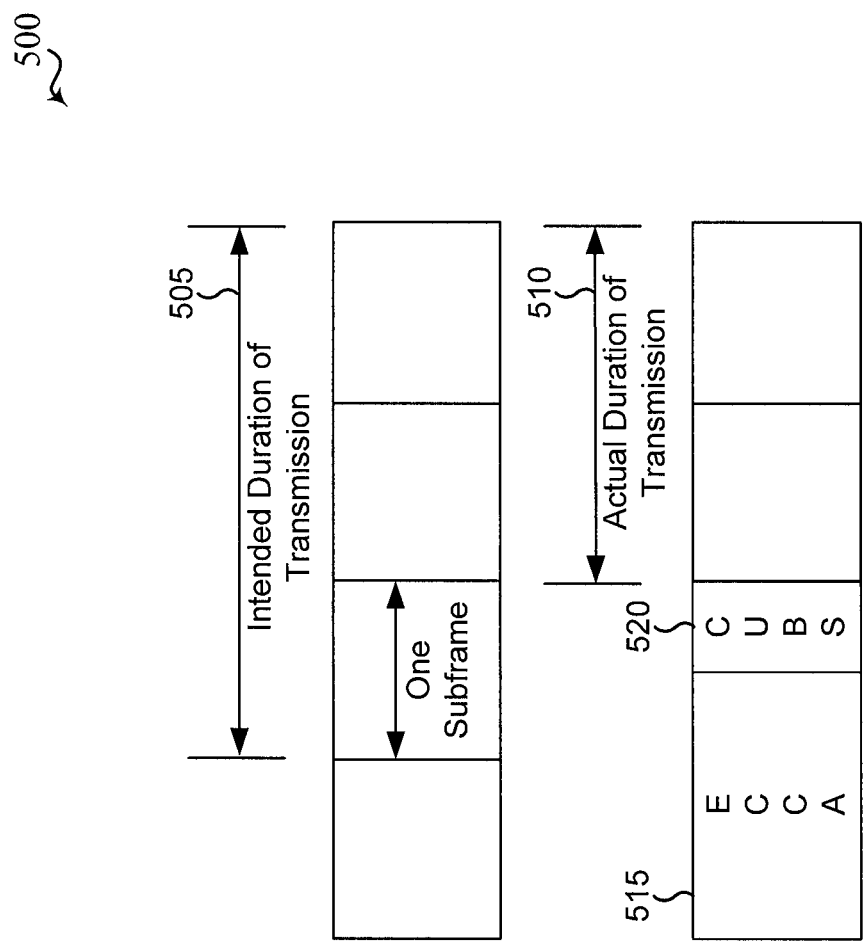
FIG. 5 is an illustration of an example of an extended CCA (ECCA) procedure performed by a transmitting apparatus when contending for access to a contention-based shared radio frequency spectrum band, in accordance with various aspects of the present disclosure.

FIG. 5 is an illustration of an example 500 of an extended CCA (ECCA) procedure 515 performed by a transmitting apparatus when contending for access to a contention-based shared radio frequency spectrum band, in accordance with various aspects of the present disclosure. In some examples, the ECCA procedure 515 may be an example of the downlink CCA procedure 345 or uplink CCA procedure 365 described with reference to FIG. 3. The ECCA procedure 515 may include a random number of CCA procedures, and in some examples may include a plurality of CCA procedures. The ECCA procedure 515 may, therefore, have a variable duration. In some examples, the ECCA procedure 515 may be performed in accordance with an LBT-load based equipment (LBT-LBE) protocol (e.g., the LBT-LBE protocol described by EN 301 893). The ECCA procedure 515 may provide a greater likelihood of winning contention to access the contention-based shared radio frequency spectrum band, but at a potential cost of a shorter data transmission. Following the ECCA procedure 515, a channel usage signal, such as a CUBS 520, may be transmitted, followed by a data transmission. By way of example, the data transmission may have an intended duration 505 of three subframes and an actual duration 510 of two subframes.

As indicated above, FIG. 5 is provided as an example. Other examples are possible and may differ from what was described in connection with FIG. 5.

Figure 6:
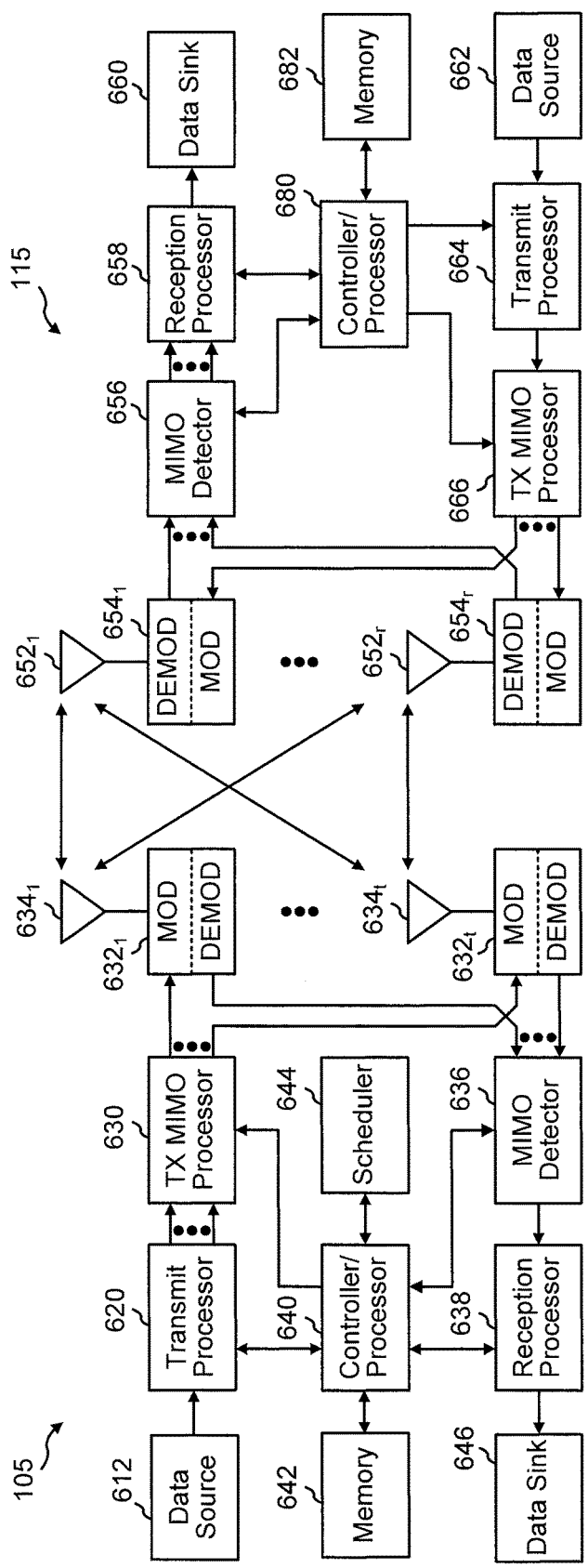
FIG. 6 shows a block diagram of a design of a base station/eNB and a UE, which may be one of the base stations/eNBs and one of the UEs in FIG. 1.

FIG. 6 shows a block diagram of a design of a base station/eNB 105 and a UE 115, which may be one of the base stations/eNBs and one of the UEs in FIG. 1. The eNB 105 may be equipped with antennas 634a through 634t, and the UE 115 may be equipped with antennas 652a through 652r. At the eNB 105, a transmit processor 620 may receive data from a data source 612 and control information from a controller/processor 640. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 620 may process (e.g., encode and symbol map) the data and control information to obtain data symbols and control symbols, respectively. The transmit processor 620 may also generate reference symbols, e.g., for the primary synchronization signal (PSS), secondary synchronization signal (SSS), and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODS) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 115, the antennas 652a through 652r may receive the downlink signals from the eNB 105 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 115 to a data sink 660, and provide decoded control information to a controller/processor 680.

On the uplink, at the UE 115, a transmit processor 664 may receive and process data (e.g., for the physical uplink shared channel (PUSCH)) from a data source 662 and control information (e.g., for the physical uplink control channel (PUCCH)) from the controller/processor 680. The transmit processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the eNB 105. At the eNB 105, the uplink signals from the UE 115 may be received by the antennas 634, processed by the modulators 632, detected by a MIMO detector 636 if applicable, and further processed by a receive processor 638 to obtain decoded data and control information sent by the UE 115. The processor 638 may provide the decoded data to a data sink 646 and the decoded control information to the controller/processor 640.

The controllers/processors 640 and 680 may direct the operation at the eNB 105 and the UE 115, respectively. The controller/processor 640 and/or other processors and modules at the eNB 105 may perform or direct the execution of various processes for the techniques described herein. The controllers/processor 680 and/or other processors and modules at the UE 115 may also perform or direct the execution of the functional blocks illustrated in FIGS. 8, 10A, 10B, and 12, and/or other processes for the techniques described herein. The memories 642 and 682 may store data and program codes for the eNB 105 and the UE 115, respectively. A scheduler 644 may schedule UEs for data transmission on the downlink and/or uplink.

A device, such as a UE, may have multiple antennas (N) to use for receiving and/or transmitting signals. The device may divide the use and assignment of the antennas to use for particular radio access technologies (RATs), such as LTE, WiFi, etc., for particular carrier frequencies, or both. For example, the device may use a fixed number of antennas for one carrier in CA cases, or it may use a fixed number of antennas for WiFi when the device supports both WiFi and other technologies, such as LTE. In one example, a UE may have four antennas and assign two of the antennas for WiFi communication and two antennas for LTE communications. A device, such as a UE, may also dynamically or semi-statically select a number of antennas for one technology or one carrier (antenna selection). In such dynamic or semi-static schemes, the sharing or selection may be triggered by a particular measurement result, such as channel quality indicator (CQI), reference signal receive power (RSRP), and the like.

Communications networks, such as LTE, may have frequency division multiplexing (FDM) implementations and time division multiplexing (TDM) implementations. Sharing options in FDM implementations are not truly sharing different antennas, but rather sharing the frequency spectrum received over the antenna. For example, a UE may use a diplexer/switch in order to use all antennas at the same time for different air-interfaces. The diplexer/switch acts as a filter by filtering out the unwanted frequencies. However, in such FDM sharing schemes, there is typically a considerable loss in signal strength as the signals are filtered. Such losses can also increase with the higher frequency bands. TDM implementations may actually use or assign separate antennas for each air-interface/technology. Thus, when communications over such air-interfaces/technologies are not in use, those antennas that were assigned or designated for the unused communications may be shared with other air-interfaces/technologies. The various aspects of the present disclosure are directed to communication systems using TDM implementations.

In ideal operation, a UE would monitor for PDCCH in every subframe. However, in normal operation, because the UE would not know exactly when the network transmits PDCCH, the UE would have to be awake all of the time. This would create an unacceptable level of power consumption at the UE. The common solution to this issue is discontinuous reception (DRX), in which the UE enters a sleep mode for a certain period of time and then wakes up for a certain period of time, expecting to receive the transmitted PDCCH during that period of time if a PDCCH is, in fact, transmitted. An on-duration timer is used to count the amount of time a UE is in an on or active state. The total of the on-duration time and the off (sleep) time is referred to as the DRX cycle. When the UE receives the PDCCH, a second timer—referred to as an inactivity timer—is started which counts for a predetermined amount of time. The UE remains active during the inactivity timer, which may extend UE activity beyond the end of the on-duration timer. If no subsequent PDCCH is received within the inactivity timer duration, the UE will again enter sleep mode until the beginning of the next DRX cycle.

In LTE Rel-12 carrier aggregation, DRX active time is common across all serving cells. Therefore, if a UE is active in one cell, it is active on all of them. Active time includes the time when any DRX timer (e.g., an on-duration timer, inactivity timer, etc.) is running, a UE has unreported data in the buffer, a UE expects scheduling retransmission, and the like. The common DRX timing allows for maximum scheduler flexibility when a base station has downlink data to send. Moreover, because the UE is active on all cells, there are no constraints with regard to cross carrier scheduling.

Another LTE Rel-12 technology includes dual connectivity. Dual connectivity provides for the UE to have two or more independent connections to two different access points or base stations. Control for each base station occurs through the primary carrier of each cell or group of cells. In dual connection, the sets of cells connected to the UE are grouped into a master cell group (MCG) and a secondary cell group (SCG). Each such MCG and SCG would include its own primary component carrier for controlling and scheduling operations independently at the MCG and SCG. For DRX operations in dual connection, the DRX procedure is also independent across MCG and SCG. When the MCG is designated for higher QoS payload, such as voice over IP (VoIP) communications, Voice over LTE (VoLTE), and the like, and the SCG is designated for lower QoS payload, such as regular data, the DRX timing may be scheduled and set independently, in order to give the UE a better chance to be active when PDCCH are transmitted on either the MCG or SCG. Also, because each cell group is independently scheduled there is typically no cross-carrier scheduling across the cell groups.

Networks beyond LTE Rel-12 are contemplated to include non-contention-based spectrum, such as in current LTE configurations, and contention-based shared spectrum, including unlicensed carriers. License assisted access (LAA) mode networks operate with both non-contention-based spectrum and contention-based spectrum. The non-contention-based spectrum may be used for the primary carrier, while the contention-based shared spectrum may be used for secondary carriers. With guaranteed transmission, control signaling may be communicated with the primary carrier on the non-contention-based spectrum. DRX operations in LTE/LTE-A networks configured for LAA may provide carrier aggregation operations as the baseline. Therefore, in one example operation, a UE in a network configured for LAA may have a common DRX on all cells.

Because such networks use contention-based shared spectrum, channel availability for transmissions is uncertain. Thus, there is no guarantee that a cell with contention-based spectrum will be available for transmission when a base station has data and a served UE is active in DRX on-duration. Before a network entity is allowed to transmit over a contention-based carrier, the entity performs an LBT procedure, such as a clear channel assessment (CCA). If another transmitter happens to be transmitting on the channel when the network entity performs a CCA check, the CCA check will fail, and the requesting entity will be unable to transmit the data. Thus, because the transmissions do not occur at a predictable, guaranteed interval, longer DRX timers (e.g., on-duration timer, inactivity timer) may increase the probability of the UE being active when the channel is actually secured by the transmitter. However, maintaining a longer UE active state results in more inefficient power usage and unnecessary power expenditures when the base station cannot secure the channel, but the UE still is awake to monitor.

Figure 7:
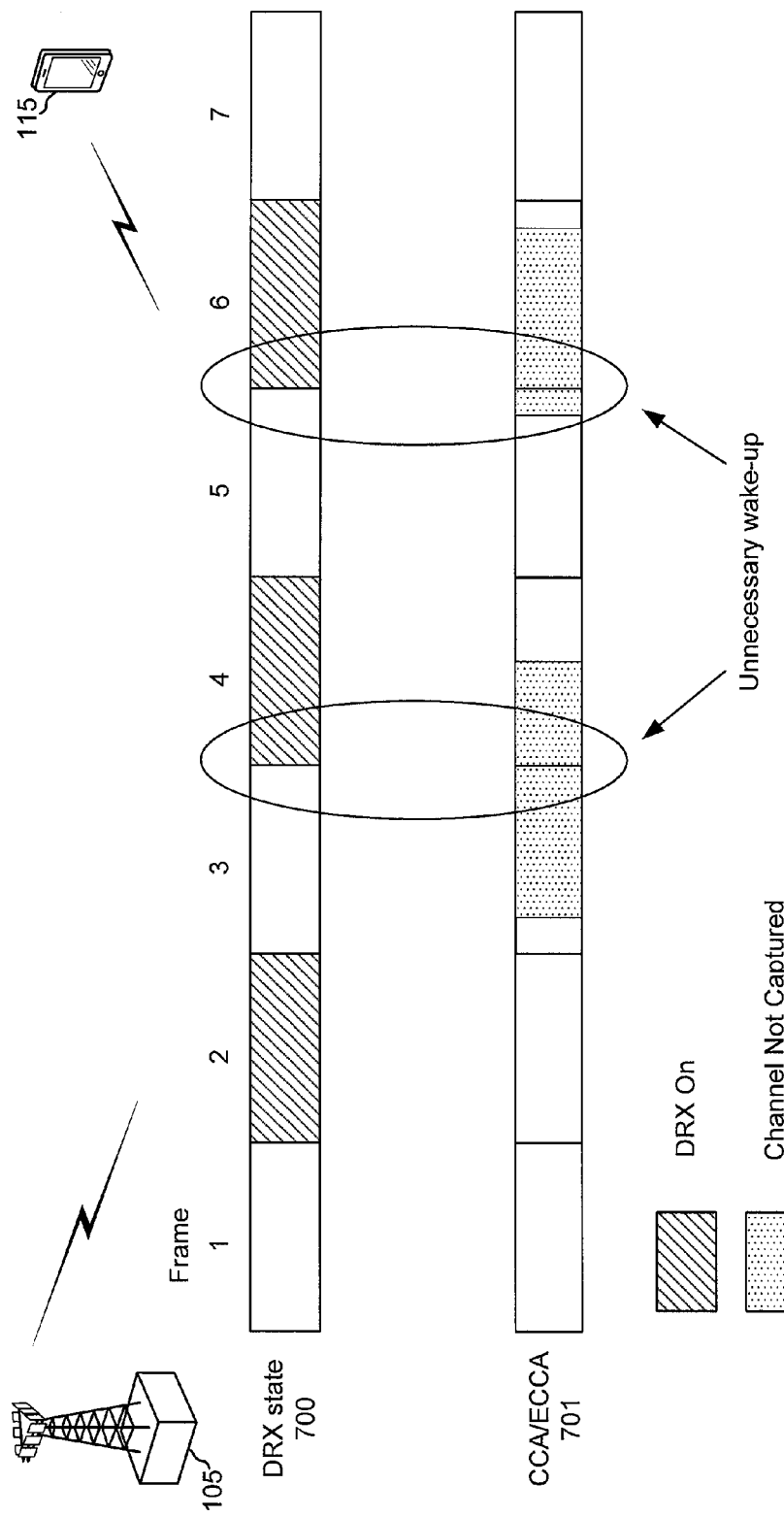
FIG. 7 is a block diagram illustrating a UE served by base station.

FIG. 7 is a block diagram illustrating a UE 115 served by base station 105. DRX state 700 illustrates 7 frames of communication involving UE 115 and base station 105. CCA/ECCA 701 provides a conceptual timeline synchronized with the frames of DRX state 700 that reflects whether the contention-based channel has been captured by base station 105 during the illustrated frames or portions of frames. For purposes of the illustrated example, UE 115 begins at frame 1 in sleep mode. At frames 2, 4, and 6, UE 115 wakes up for the on-duration period of DRX operations. However, the transmitters/base station 105 has not reserved the channel during the majority of the latter part of frame 3 and the beginning of frame 4. Therefore, as UE 115 wakes up for the on-duration of frame 4, base station 105 cannot transmit. Thus, the power expended by UE 115 to wake up and monitor for PDCCH at frame 4 is wasted. Similarly, at frame 6, UE 115 again wakes up after DRX sleep mode to monitor for PDCCH. However, because base station 105 is unable to secure the channel across the transition from frame 5 to frame 6, UE 115 again unnecessarily wakes up, needlessly wasting power.

The configuration of DRX operations may be optimized depending on the type of data that is part of the communication (e.g., VoIP, VoLTE, non-VoLTE, regular data, and the like. In a first example operation, a UE, such as UE 115, operates with regular data (e.g., non-VoLTE). A typical DRX configuration for regular data includes an on-duration=10 ms, inactivity timer=100 ms, and the DRX cycle=320 ms. In a carrier aggregation scenario with a secondary cell having contention-based spectrum, the base station (e.g., base station 105) can schedule transmissions on the PCell during the DRX on-duration if the SCell is unavailable. With a common DRX process across all cells, if the UE receives the scheduled transmissions on the PCell during on-duration, the 100 ms inactivity timer may improve the probability that the UE is active when the contention-based SCell becomes available thereafter.

In networks with contention-based spectrum configured as standalone or dual connection, the current DRX on-duration timing will most likely not be sufficient for a UE (e.g., UE 115) to remain active long enough for a base station to capture the channel in a contention-based PCell of the MCG or PSCell of the SCG. Therefore, in order to increase the likelihood that the base station may be able to capture the channel while the UE is active, it may be preferable to significantly increase the DRX on-duration period (e.g., 15 ms or 20 ms) to ensure the channel is captured while the UE is active in DRX on-duration.

In a second example operation, a UE (e.g., UE 115) communicates with voice over LTE (VoLTE) data in addition to regular data, where the regular data may be offloaded to the contention-based spectrum. Because VoLTE communications may require better coverage, higher QoS, with less data traffic delay, VoLTE communications may be maintained at the primary cell with the guaranteed, non-contention-based spectrum. In a typical DRX configuration, VoLTE-optimized DRX may provide for on-duration=2 ms, inactivity timer=2 ms, and DRX cycle=40 ms, while data-optimized DRX may provide for on-duration=10 ms, inactivity timer=100 ms, and DRX cycle=320 ms. However, optimized DRX operations may not be beneficial for networks including contention-based spectrum.

In carrier aggregation scenarios including secondary cells with contention-based spectrum, the VoLTE-optimized DRX timers would not allow sufficient time for a base station to capture the channel on the contention-based cell, thus, resulting in low throughput for data traffic. In contrast, the data-optimized timers would keep the UE in an active DRX state with the PCell for much longer than necessary, despite having only VoLTE traffic, which would lead to inefficient battery consumption. For dual connection scenarios, because each cell has an independent DRX configuration, there would be no issue, as the independent DRX process can be configured on the PCell and PSCell to accommodate the type of traffic.

For networks in a standalone configuration with contention-based spectrum, the VoLTE communications are served on the contention-based spectrum, and are, thus, not guaranteed. However, because the VoLTE optimized DRX could not meet the QoS target for VoLTE over contention-based spectrum, current VoLTE communications would likely not be practical over contention-based spectrum.

In summary, for a UE with best-effort, regular data service, the current DRX operation may provide sufficient DRX parameters, regardless of whether the network is configured as carrier aggregation, dual connection, or standalone with contention-based spectrum. For a UE with higher-effort data services, such as VoLTE, VoIP, and the like), plus regular data service, separate DRX configurations on the non-contention-based spectrum and the contention-based spectrum can improve battery efficiency in carrier aggregation. This separate DRX configuration is also already possible for dual connection networks with its independent scheduling of MCG and SCG. Various aspects of the present disclosure provide for a new DRX procedure involving networks with contention-based spectrum.

In addressing the issues with DRX involving networks with contention-based spectrum, there are multiple possible approaches to consider. For example, in one aspect, The common-DRX procedure may be maintained. In such aspects, the DRX on-duration period may be lengthened in order to increase the opportunity for scheduling and allowing the base station to secure the channel for transmission while the UE is active. Any increase in DRX on-duration length will result in increased active time in all cells. Thus, there is a potential impact on battery or power management. However, some features involving layer 1 (L1)/layer 2 (L2) signaling may be considered that could reduce such an impact on power management.

In another aspect, separate DRX configurations may be considered for the cells with contention-based spectrum. Separating the DRX allows for optimization based on data type, which can be more aggressive on the PCell with non-contention-based spectrum, and more relaxed on the SCells with contention-based spectrum. In alternative aspects, some of the DRX parameters could remain common, e.g DRX cycle, offset, and the like. A separate DRX configuration may also help to avoid unnecessary wake-up on PCell.

In another aspect, the DRX procedures may be changed completely from current procedures for cells involving contention-based spectrum. For example, a more power-optimized operation may be implemented when a cell with non-contention-based spectrum is not available, such as in standalone and dual connection configured networks. In such example aspect, the DRX procedures may be triggered on detection of a channel usage signal, such as a CUBS or other transmission or reference signal that indicates the usage of the channel for transmission.

Figure 8:
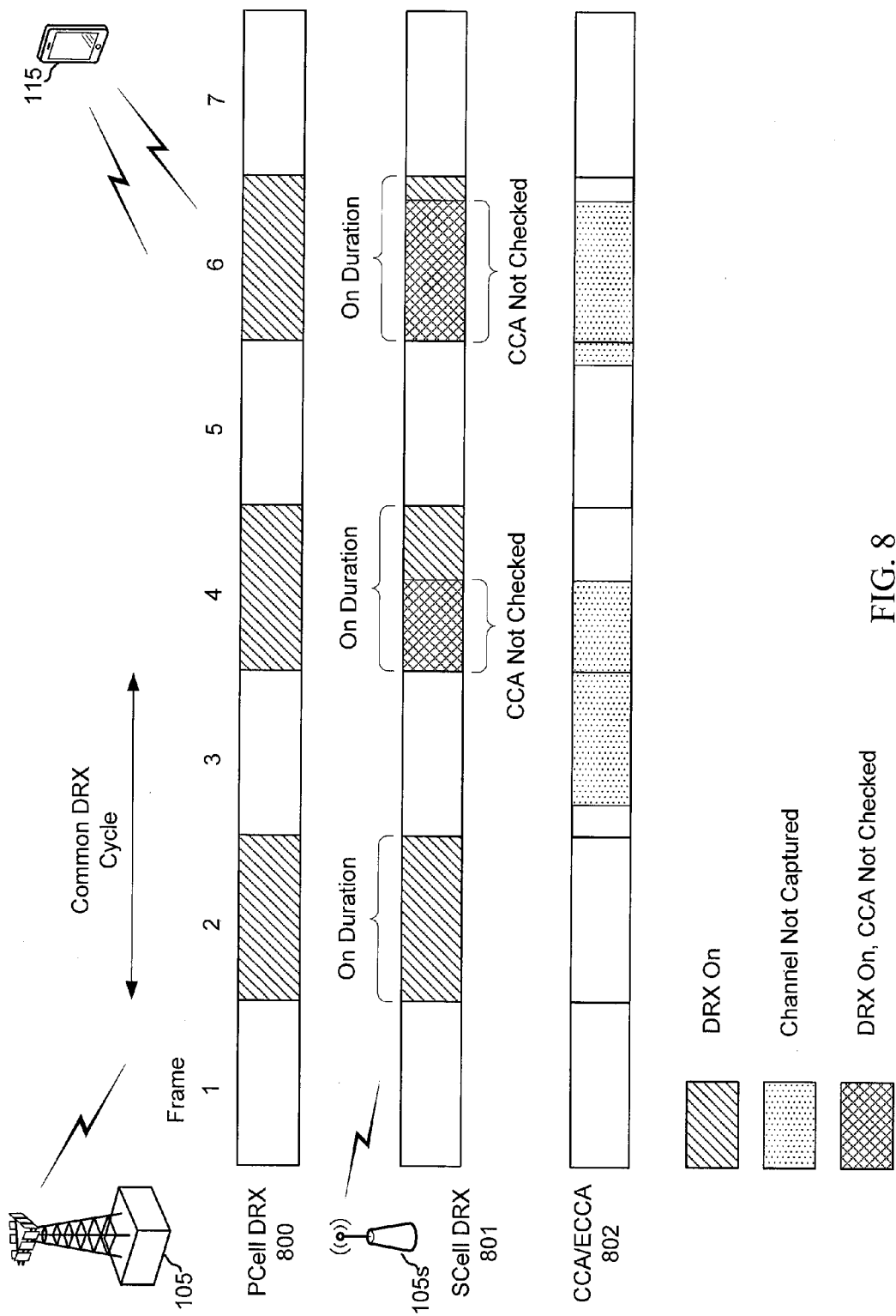
FIG. 8 is a block diagram illustrating a UE engaged in communications over a PCell from base station and an S Cell from base station.

FIG. 8 is a block diagram illustrating a UE 115 engaged in communications over a PCell from base station 105 and an SCell from base station 105s. Base station 105s operates the SCell using contention-based spectrum. Therefore, prior to engaging in any transmissions to UE 115 on the SCell, base station 105s first performs a CCA check that is successful. The DRX operations for UE 115, as illustrated in FIG. 8, are common over both the PCell and SCell. PCell DRX 800 illustrates the DRX operations of the PCell on Frames 1-7, while SCell DRX 801 illustrates the DRX operations of the SCell on the same frames. CCA/ECCA 802 provides a conceptual timeline synchronized with the frames of PCell DRX 800 and SCell DRX 801 that reflects whether the contention-based channel has been captured by base station 105s during the illustrated frames or portions of frames. The DRX operations are modified at UE 115 to increase the DRX on-duration timer and inactivity timer long enough to improve the probability that UE 115 will be active when base station 105s is able to successfully reserve the channel (e.g., 15-20 ms). At frame 2, PCell DRX 800 identifies that UE 115 is active and monitoring the PCell and, with the common DRX process, SCell DRX 801 also identifies that UE 115 is active and monitoring the SCell. Base station 105s has captured the contention-based channel at frame 2, so the DRX process may be successful, if there is data to transmit from base station 105s. At frames 4 and 6, UE 115 is also active and monitoring the PCell and SCell. However, base station 105s has not captured the contention-based channel and, therefore, for portions of frames 4 and 6, UE 115 is unnecessarily active. While base station 105s does not secure the channel at the beginning of the subframes, base station 105s does secure the channel during the on-duration periods over frames 4 and 6. Therefore, a useful active on-duration may occur for UE 115 later in these subframes. However, if base station 105s had failed to secure the channel during the on-duration, the common DRX solution illustrated in FIG. 8 would lead to an unnecessary wake-up on the PCell and SCell and further does not optimize a useful wake up time of UE 115.

Figure 9:
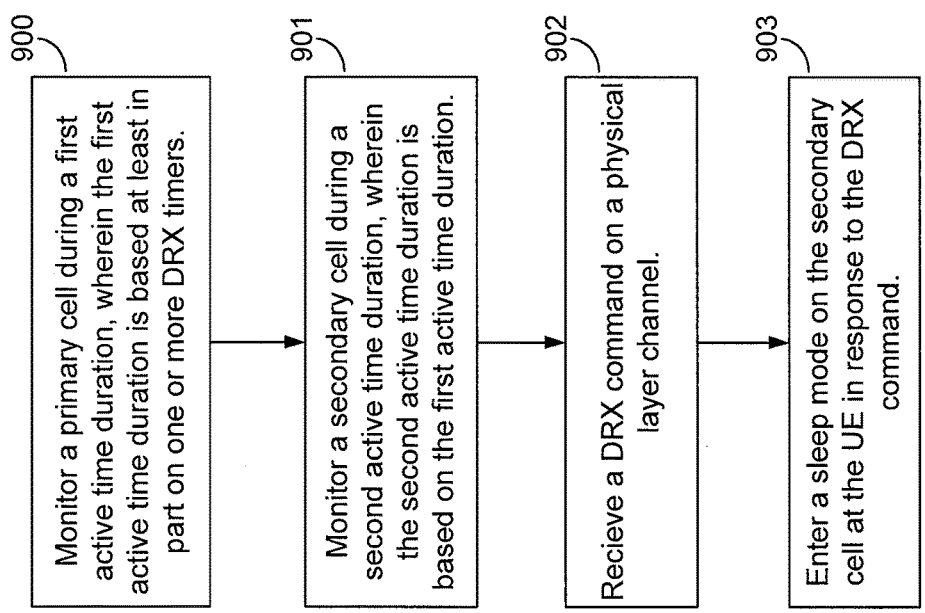
FIG. 9 is a block diagram illustrating example blocks executed to implement one aspect of the present disclosure.
Figure 10:
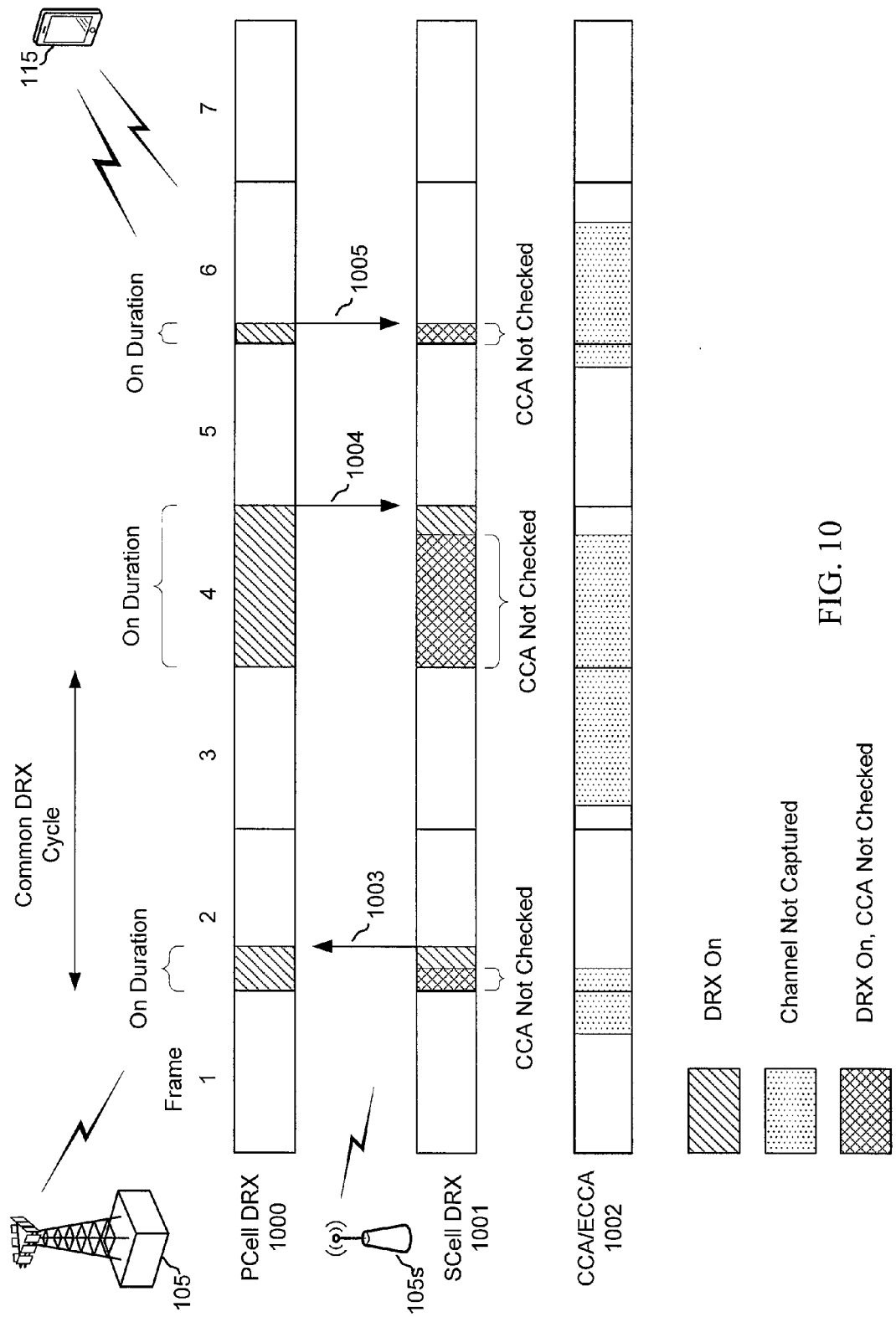
FIG. 10 is a block diagram illustrating an UE and base stations configured according to one aspect of the present disclosure.

FIG. 9 is a block diagram illustrating example blocks executed to implement one aspect of the present disclosure. The blocks of FIG. 9 will also be described with respect to the hardware, components, and features illustrated in FIG. 10. FIG. 10 is a block diagram illustrating UE 115 and base stations 105 and 105s configured according to one aspect of the present disclosure. UE 115 and base stations 105 and 105s may be configured with the components and hardware illustrated in FIG. 6 to execute and implement the features and actions described herein.

At block 900, a UE, such as UE 115, monitors a primary cell during a first active time duration, wherein the first active time duration is based at least in part on one or more DRX timers. As a part of the DRX process, the length of time that UE 115 is active and monitoring for a downlink control channel is managed by one of the DRX timers (e.g., on-duration timer, inactivity timer). At the beginning of a DRX cycle, such as at frames 2, 4, and 6, UE 115 wakes up from a sleep mode and monitors the primary cell of base station 105, as illustrated in PCell DRX 1000. When UE 115 wakes up, the DRX on-duration timer is initiated. If no control channel is received before expiration of the DRX on-duration timer, then UE 115 will re-enter sleep mode. However, if a control channel is received during the on-duration time, a DRX inactivity timer is started. UE 115 will remain active during the inactivity timer monitoring the PCell for any additional control channels. This activity during the inactivity timer may extend the active state of the UE beyond the expiration of the DRX on-duration timer. Thus, the first active time duration is based at least in part on either or both of the on-duration timer and the inactivity timer.

At block 901, UE 115 also monitors the secondary cell during a second active time duration, wherein the second active time duration is based on the first active timer duration. In the illustrated aspect of the DRX procedure, a common DRX is maintained over the primary and secondary cells. Thus, the DRX on-duration time of UE 115 for the secondary cell is configured to be the same as the DRX on-duration time of the primary cell, as shown at S Cell DRX 1001. Moreover, if a downlink control channel is detected on either of the primary or secondary cells during the active on-duration time, UE 115 will remain active for the duration of the inactivity timer.

At block 902, UE 115 receives a DRX command, such as DRX commands 1003-1005, on a physical layer channel. For example, UE 115 receives DRX command 1003 from a base station, such as base station 105 or 105s. If the base station (either base station 105 or 105s for the primary or secondary cell, respectively) does not intend to (or cannot) schedule UE 115 on the contention-based spectrum of the secondary cell (e.g., due to LBT frame not checking out as clear, as shown by CCA/ECCA 1002 at the end of frame 1 and beginning of frame 2, or by not having data for UE 115), base stations 105 or 105s transmit DRX commands 1003-1005 to UE 115 to enter DRX or sleep mode for the secondary cell. DRX commands 1003-1005 or similar such command or control signals may be sent via L1 signaling. For example, a 1-bit flag may be included in the grant from either the PCell or SCell. Unlike the legacy DRX commands, DRX commands 1003-1005 do not require UE 115 to process a medium access control (MAC) control element (CE) and send HARQ feedback prior to entering sleep mode.

At block 903, UE 115 enters a sleep mode on the secondary cell in response to DRX commands 1003-1005. For example, as soon as UE 115 receives either of DRX commands 1003-1005, UE 115 enters sleep mode toward the beginning of frame 2, after receiving DRX command 1003, at the end of frame 4, after receiving DRX command 1004, and toward the beginning of frame 6, after receiving DRX command 1005. Thus, when UE 115 receives DRX commands 1003-1005, UE 115 goes directly to DRX or sleep mode. UE 115 also stops any DRX timers (e.g., DRX on-duration timer, inactivity timer) upon reception of the DRX command.

Figure 11:
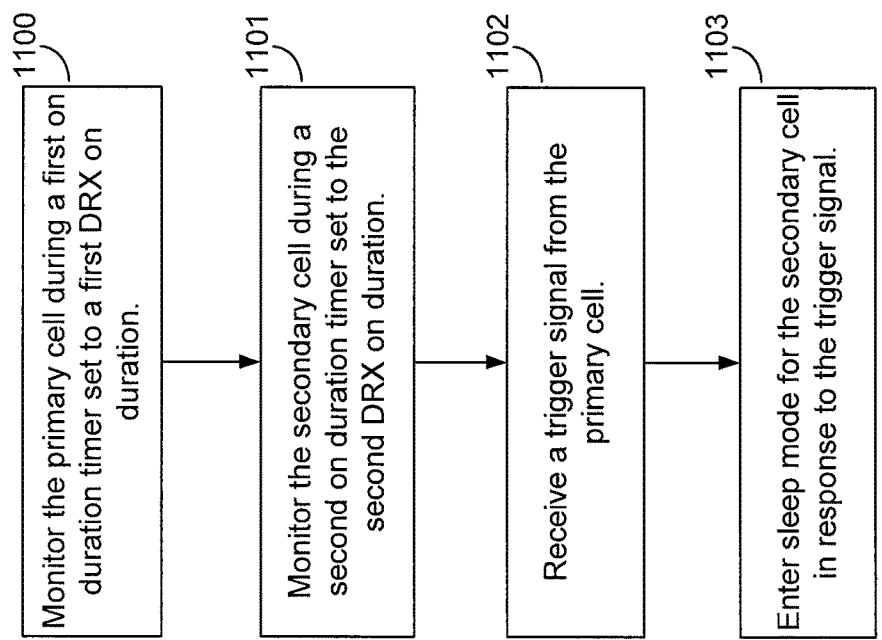
FIG. 11 is a block diagram illustrating example blocks executed to implement one aspect of the present disclosure.
Figure 12:
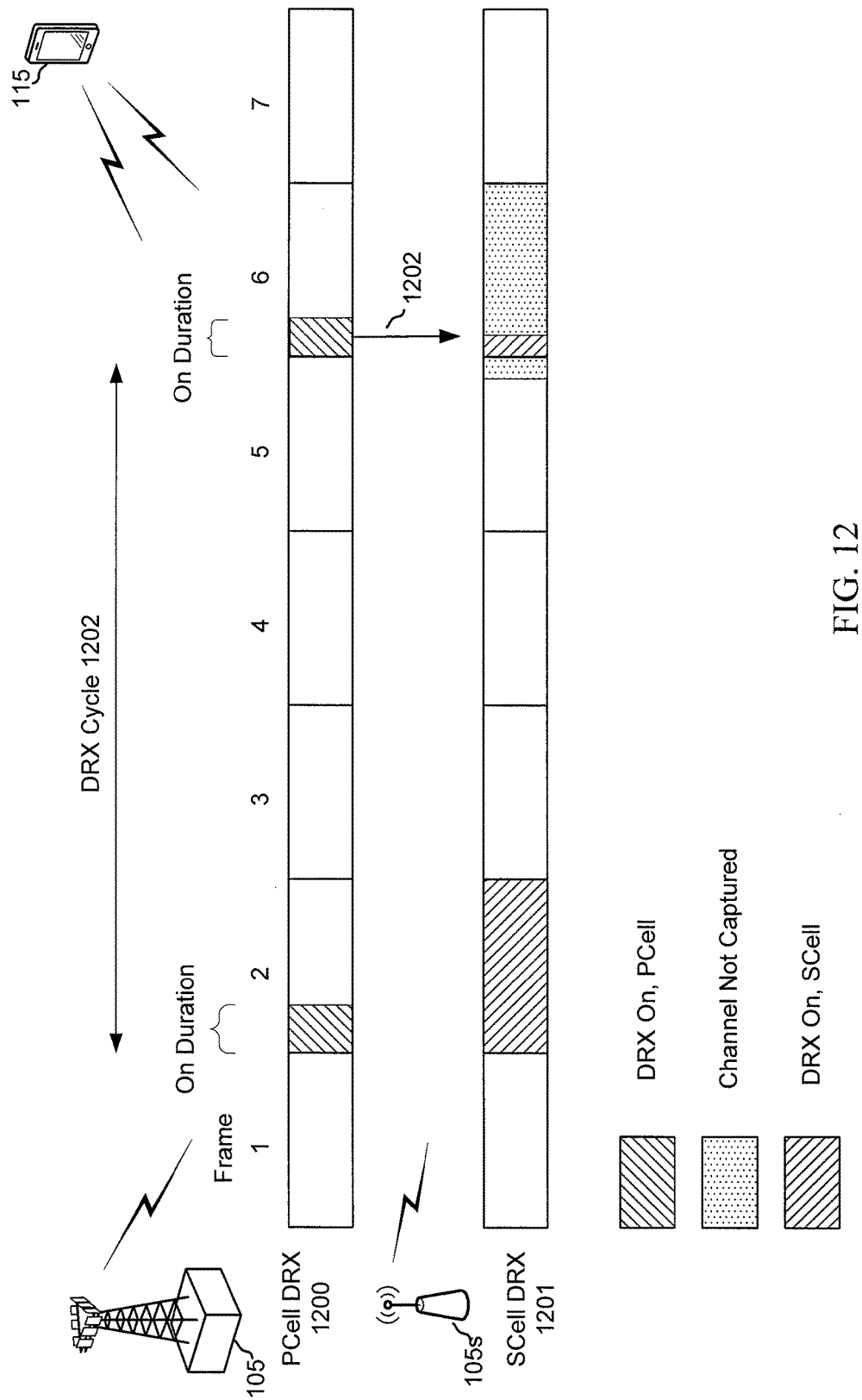
FIG. 12 is a block diagram illustrating a UE and base stations configured according to one aspect of the present disclosure.

According to aspects of the disclosure as illustrated in FIG. 9, the use of DRX commands 1003-1005 that UE 115 can directly act upon minimizes UE wake up time when the LBT frame checks out early. However, if the LBT frame checks out late, the power savings could be limited. For example, as shown at CCA/ECCA 1002, the channel has been successfully captured early in frame 2. Thus, base station 105s would be able to transmit data as soon as the channel is reserved and send DRX command 1003 to UE 115 which triggers sleep mode before expiration of the DRX on-duration timer. Similarly, at frame 6, CCA/ECCA 1002 indicates that base station 105s did not have a successful CCA check, thus, has not captured the channel when the DRX cycle begins. Base station 105 has no data to transmit to UE 115, and, thus, sends DRX command 1005 to UE 115 triggering sleep mode on the SCell FIG. 11 is a block diagram illustrating example blocks executed to implement one aspect of the present disclosure. The blocks of FIG. 11 will also be described with respect to the hardware, components, and features illustrated in FIG. 12. FIG. 12 is a block diagram illustrating UE 115 and base stations 105 and 105s configured according to one aspect of the present disclosure. As noted above, UE 115 and base stations 105 and 105s may be configured with the components and hardware illustrated in FIG. 6 to execute and implement the features and actions described herein. Unlike the aspect described with respect to FIGS. 9 and 10, which feature a common DRX process across the primary and secondary cells, the example aspect described with respect to FIGS. 11 and 12 feature a separate DRX process configured for each of the primary and secondary cells.

At block 1100, UE 115 monitors the primary cell during a first on-duration timer set to a first DRX on-duration. The DRX on-duration for the primary cell allows UE 115 to monitor for downlink control signals from base station 105 over the non-contention-based spectrum of the primary cell. The primary cell from base station 105 is configured with the DRX on-duration timer and an inactivity timer that are different than the DRX timers of the secondary cell. The DRX cycle 1202 illustrated in FIG. 12 has a length of four frames, beginning at frame 2 and ending at the end of frame 5. While the DRX timers of the primary cell are separate from the DRX timers of the secondary cell, for purposes of the aspect illustrated and described with respect to FIGS. 11 and 12, DRX cycle 1202 and offset may be common to both cells.

At block 1101, UE 115 monitors the secondary cell during a second on-duration timer set to a second DRX on-duration different than the first DRX on-duration. The second on-duration timer and second inactivity timer, used for when a downlink control channel is detected on the secondary cell during the second on-duration timer, may be longer than in the primary cell, as the contention-based spectrum of the secondary cell may cause additional time for base station 105s to reserve the resource for transmission. As indicated above, DRX cycle 1202 and offset may be the same in both the primary and secondary cells in order to maximize active time overlap and minimize wakeup transitions across cells. Thus, the on-duration time of the primary cell, shown in PCell DRX 1200, at frame 2 overlaps with the on-duration time of the secondary cell at frame 2, shown in SCell DRX 1201. The overlapping active times in the primary and secondary cell may also allow for cross-carrier scheduling from the primary cell.

At block 1102, UE 115 receives a trigger signal from the primary cell. The trigger signal may include a DRX command transmitted over the physical layer or via L1 signaling, such as DRX command 1202, from base station 105 for the primary cell.

At block 1103, UE 115 enters sleep mode for the secondary cell in response to the trigger signal. The trigger signal, such as DRX command 1202 from base station 105 in frame 6, causes UE 115 to enter sleep mode. Base station 105 determines that base station 105s cannot capture the contention-based spectrum or has no data to transmit, and sends DRX command 1202 instructing UE 115 to enter DRX or sleep mode.

Figure 13:
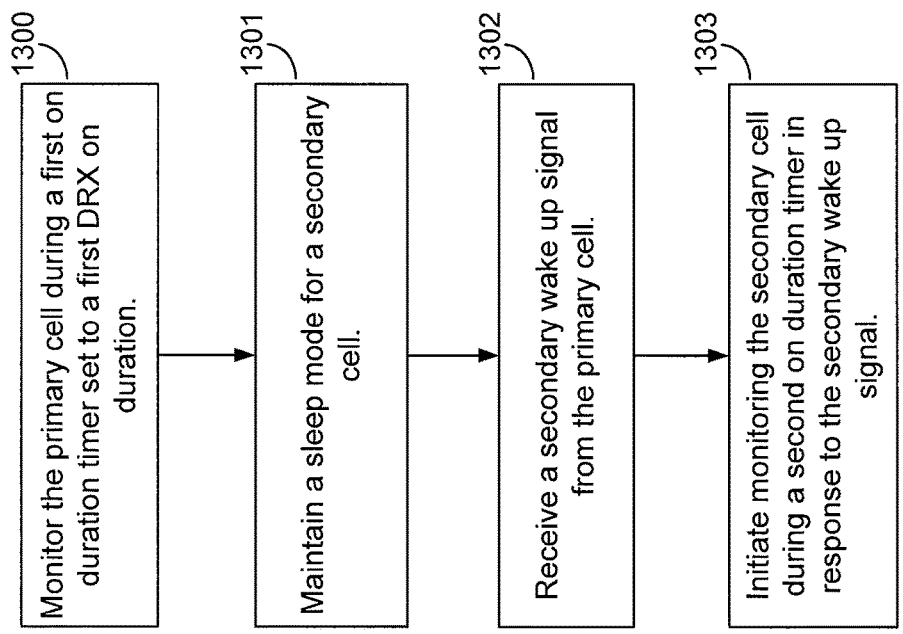
FIG. 13 is a block diagram illustrating example blocks executed to implement one aspect of the present disclosure.
Figure 14:
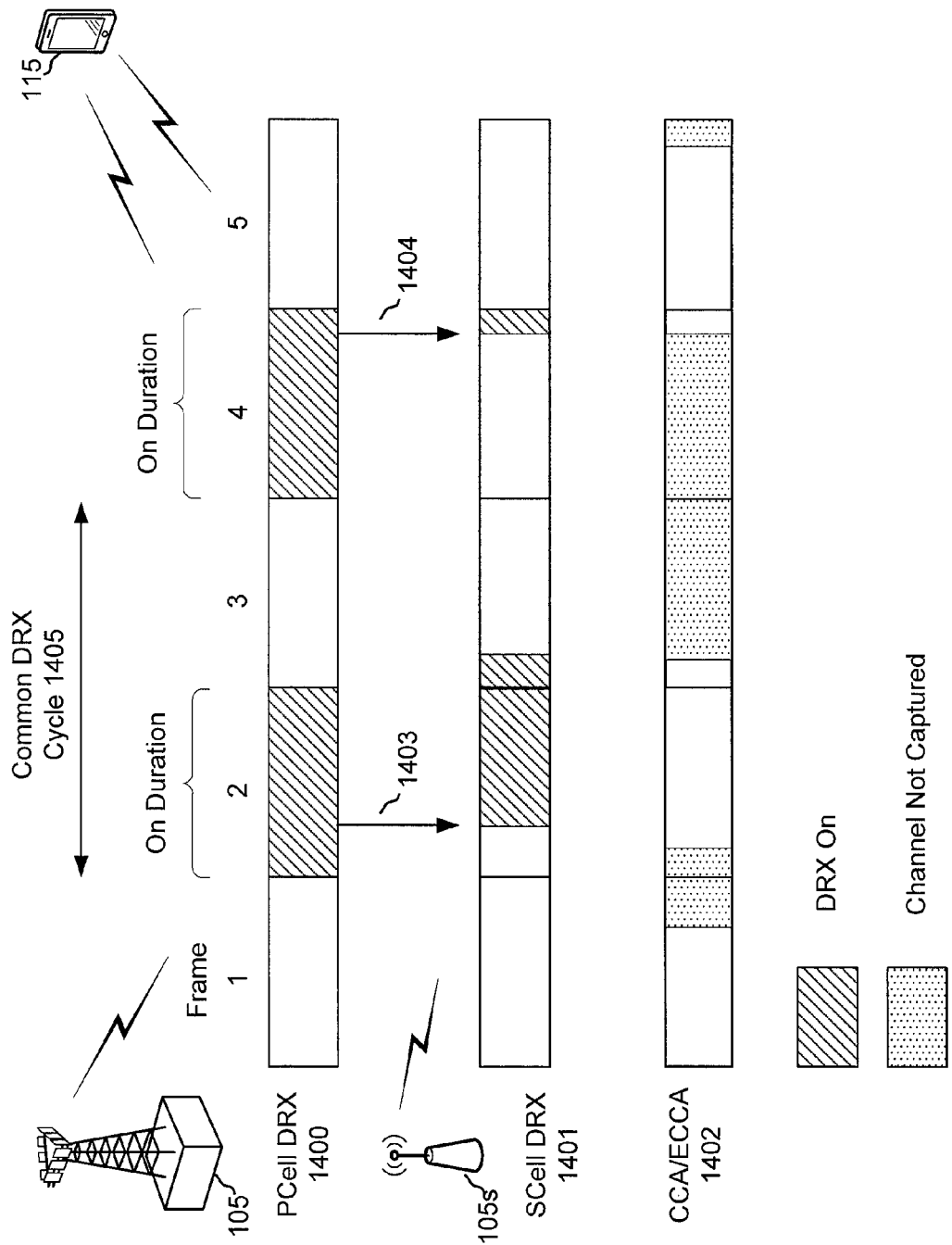
FIG. 14 is a block diagram illustrating a UE and base stations configured according to one aspect of the present disclosure.

FIG. 13 is a block diagram illustrating example blocks executed to implement one aspect of the present disclosure. The blocks of FIG. 13 will also be described with respect to the hardware, components, and features illustrated in FIG. 14. FIG. 14 is a block diagram illustrating UE 115 and base stations 105 and 105s configured according to one aspect of the present disclosure. As noted above, UE 115 and base stations 105 and 105s may be configured with the components and hardware illustrated in FIG. 6 to execute and implement the features and actions described herein. The aspects of the present disclosure illustrated in FIGS. 13 and 14 feature a separate DRX process configured for each of the primary and secondary cells in which a dynamic-type signal operates to selectively wake-up UE 115 for active on-duration of the contention-based spectrum of the secondary cell.

At block 1300, UE 115 monitors the primary cell during a first on-duration timer set to a first DRX duration. The DRX on-duration for the primary cell allows UE 115 to monitor for downlink control signals from base station 105 over the non-contention-based spectrum of the primary cell. The primary cell of base station 105 is configured with the DRX on-duration and inactivity timers that are different than the DRX timers of the secondary cell. As shown in PCell DRX 1400, UE 115 begins DRX on-duration at frame 2 and again at frame 4, with a new DRX cycle, common DRX cycle 1405.

At block 1301, UE 115 maintains a sleep mode for the secondary cell. By maintaining sleep mode for the contention-based spectrum of the secondary cell of base station 105s, UE 115 may conserve power and avoid unnecessary wake-up periods. As shown in SCell DRX 1401, UE 115 maintains sleep mode at the beginning of frame 2 after it has begun DRX on-duration of the primary cell.

At block 1302, UE 115 receives a secondary wake-up signal from the primary cell. For example, base station 105 begins its on-duration active monitoring at frame 2. However, because base station 105s has not captured the contention-based spectrum at that time, as shown in CCA/ECCA 1402, UE 115 remains in the sleep mode for the secondary cell. When base station 105 detects that base station 105s has reserved the channel, base station 105 transmits a secondary wake-up signal 1403 to UE 115.

At block 1303, UE 115 initiates monitoring the secondary cell during a second on-duration timer in response to the secondary wake-up signal. For example, when UE 115 receives secondary wake-up signal 1403, UE 115 begins active on-duration monitoring of the secondary cell, as shown at frame 2 of SCell DRX 1401. The length of the second on-duration timer may be based on the primary cell wake-up. For example, the second on-duration timer may be initiated when the primary cell wakes up during DRX active time, even though UE 115 may remain in sleep mode for the secondary cell. As illustrated, when UE 115 begins active DRX on-duration of the primary cell at frame 4, the first on-duration timer and second on-duration timer begin, even though UE 115 is in sleep mode with regard to the secondary cell. Once activated via secondary wake-up signal 1404, UE 115 will actively monitor the contention-based spectrum of the secondary cell until the expiration of the first on-duration timer at the end of frame 4.

Alternatively, the second on-duration timer may be separately configured for the secondary cell. For example, when UE 115 receives secondary wake-up signal 1403, UE 115 will become active for the second on-duration timer, which results in UE 115 being active beyond the end of frame 2 and into the beginning of frame 3, even though the first on-duration timer ends at the end of frame 2.

It should be noted that the secondary wake-up signal is a dynamic-style signal, such as the signaling used with enhanced interference mitigation and traffic adaptation (eIMTA)-like L1 signaling, which allows the network to dynamically change TDD uplink-downlink configurations within the same frame. Transmitting the secondary wake-up signals using such dynamic signaling allows the base station 105 of the primary cell to wake-up UE 115 for active DRX on-duration of the secondary cell. The ability to allow UE 115 to remain in sleep mode for secondary cell DRX on-duration until dynamically woken up by base station 105 of the primary cell results in fewer unnecessary wake-ups and reduces the overall amount of time that UE 115 will be awake and performing DRX on-duration monitoring.

Figure 15:
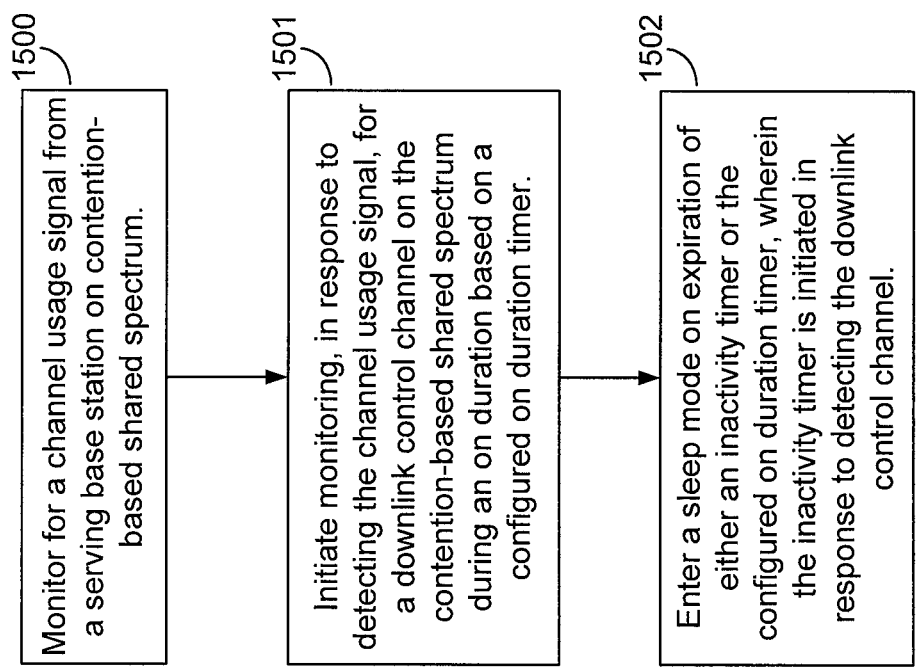
FIG. 15 is a block diagram illustrating example blocks executed to implement one aspect of the present disclosure.
Figure 16:
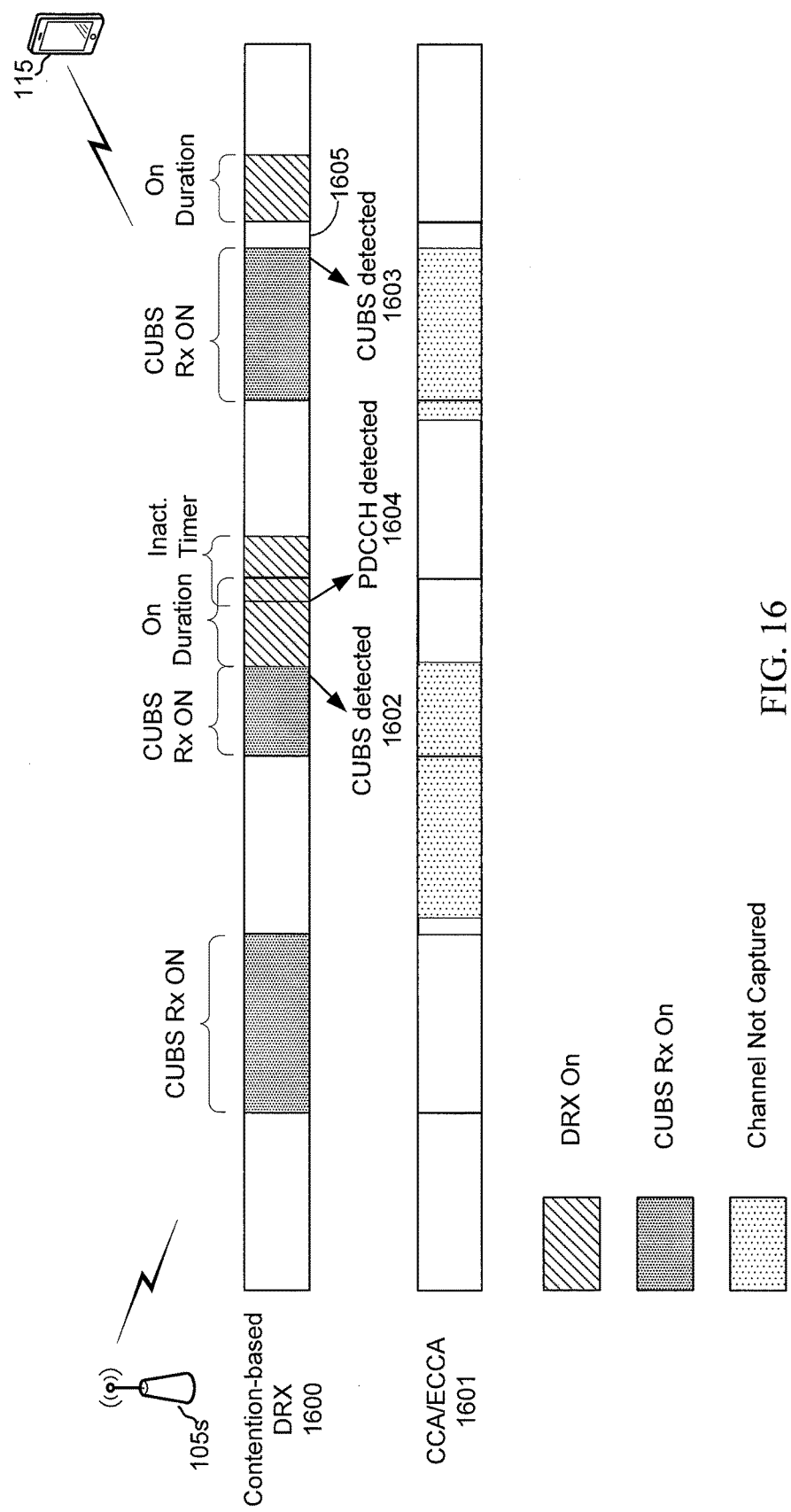
FIG. 16 is a block diagram illustrating a UE and base stations configured according to one aspect of the present disclosure.

FIG. 15 is a block diagram illustrating example blocks executed to implement one aspect of the present disclosure. The blocks of FIG. 15 will also be described with respect to the hardware, components, and features illustrated in FIG. 16. FIG. 16 is a block diagram illustrating UE 115 and base stations 105 and 105s configured according to one aspect of the present disclosure. As noted above, UE 115 and base station 105s may be configured with the components and hardware illustrated in FIG. 6 to execute and implement the features and actions described herein. The aspects of the present disclosure illustrated in FIGS. 15 and 16 feature DRX process configured specifically for operation with contention-based spectrum.

At block 1500, UE 115 monitors for a channel usage signal from a serving base station, such as base station 105s, on contention-based shared spectrum. The DRX process illustrated with regard to FIG. 15 provides for a CUBS receive on timer, during which UE 115 listens for a channel usage signal, such as CUBS, from base station 105s, as shown in frame 2 and portions of frames 4 and 6 of contention-based cell DRX 1600. The CUBS receive on timer may be scheduled for a predetermined periodicity that coincides with expected downlink transmission times from base station 105s.

It should be noted that the monitoring for CUBS reduces power consumption by UE 115 over DRX on-duration monitoring, as monitoring for CUBS is a lower power process. Moreover, until CUBS is detected, UE 115 does not perform any data/control channel or other such monitoring on the contention-based spectrum of the secondary cell.

At block 1501, in response to detecting the CUBS, UE 115 initiates monitoring for a downlink control channel on the contention-based shared spectrum during an on-duration based on a configured on-duration timer. As shown in CCA/ECCA 1601, base station 105s fails to reserve the contention-based shared spectrum during a portion of frames 3-6. During the periods where the channel is not captured that fall within a CUBS receive on timer, UE 115 will continue to monitor for CUBS, which will change to full PDCCH monitoring when CUBS is detected, such as at 1602 and 1603. Requiring CUBS detection prior to initiating full DRX on-duration monitoring potentially lowers power consumption at UE 115 and removes the uncertainty of whether base station 105s successfully captures the resource and may allow for UE 115 to prune out invalid assignments/measurements on the secondary cell.

At block 1502, UE 115 enters sleep mode on expiration of either an inactivity timer or the configured on-duration timer, wherein the inactivity timer is initiated in response to detecting the downlink control channel. For example, UE 115 enters sleep mode on the expiration of the inactivity timer across frames 4 and 5. At 1604, UE 115, during the on-duration, receives PDCCH from base station 105s. In response, the inactivity timer is activated and will continue for the timer period unless another PDCCH is detected. Alternatively, UE 115 enters sleep mode after expiration of the configured on-duration timer in frame 7. Moreover, when UE 115 detects CUBS at 1603, instead of immediately starting the DRX on-duration monitoring, UE 115 waits for a given number of subframes. UE 115, therefore, begins monitoring for the downlink control channel at frame 7.

The CUBS-triggered DRX process configured according to the example aspect provides support for power efficient standalone operations with only contention-based spectrum. When non-contention-based spectrum is not available, CUBS-triggered DRX may provide further power savings gain for carrier aggregation and dual connection operations. CUBS-triggered DRX may maximize the useful wake-up time, in which UE 115 only monitors for PDCCH when base station 1052 captures the channel. Moreover, the DRX timers only start running after CUBS detected.

Additional aspects of the present disclosure provide for DRX timer counting. Legacy DRX timers only run during subframes in which PDCCH is expected. For TDD, PDCCH subframes are signaled in system information block broadcast (SIB1) (TDD base config). For eIMTA, additional downlink subframes may be signaled dynamically via L1 signaling. UE 115 wakes-up for downlink monitoring in both the L1-signaled and PDCCH-subframes. L1 signaling may occur at the start of an eIMTA frame and UE 115 would follows the signal on the same subframe.

It should be noted that, in various aspects of the present disclosure, the DRX timers (e.g., on-duration timer, inactivity timer, and the like) may include only the downlink subframes identified in the TDD configuration signaled in the SIB messages. Any additional downlink subframes (e.g., downlink subframes, uplink subframes, special subframes, etc.) identified in eIMTA signaling would not be used in incrementing or decrementing the timers for purposes of the DRX procedures.

In networks configured with contention-based spectrum, the TDD configuration is generally determined dynamically. A UE, such as UE 115, may be aware of the TDD configuration in order to update the DRX timer. Various aspects of the present disclosure provide for alternative means for the UE to acquire the TDD configuration. In a first example, UE 115 may acquire the TDD configuration dynamically when in DRX on-duration, via the broadcast channel (e.g., PFFICH) or dedicated signaling. In a second example, UE 115 may use a predetermined base configuration for contention-based spectrum for purpose of determining the configuration of the DRX timer (similar to current eIMTA procedure). In a further alternative example implementation, UE 115 may count all subframes for DRX purposes, regardless of whether the subframes are uplink or downlink subframes.

In licensed operation, DRX operation also impacts how UE 115 performs measurements. UE 115 is, in general, not expected to perform measurements when in DRX OFF. In networks having contention-based spectrum, measurements are performed within subframes configured for DRS measurements. DRS configuration should have sufficient overlap with DRX configuration. However, due to the uncertain nature of contention-based transmissions, a UE configured with DRX may not be able to measure DRS for a long time. E.g., if the base station does not get a chance to send DRS when the UE 115 is in DRX on-duration. UE 115 wakes up from DRX to perform DRS measurements if it has not made DRS measurements for sufficiently long time. Example: DRX cycle=320 ms, DRS period=40 ms. UE wakes up every 320 ms and attempts to perform DRS measurements. If DRS is not detected after a certain number of attempts, UE wakes up every DRS period to measure DRS.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8, 10A, 10B, and 12 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
monitoring for a channel usage beacon signal, by a user equipment (UE), transmitted by a serving base station on a channel to reserve the channel in response to a successful clear channel assessment (CCA) of the channel according to a listen before talk (LBT) procedure, on contention-based shared spectrum during a channel usage beacon signal monitoring duration;
initiating an on-duration in response to detection of the channel usage beacon signal, wherein the on-duration comprises monitoring for a downlink control channel on the contention-based shared spectrum during the on-duration based on a configured on-duration timer;
entering a sleep mode on expiration of one of:
an inactivity timer, wherein the inactivity timer is initiated in response to detecting the downlink control channel, or
the configured on-duration timer;

monitoring for a discovery reference signal (DRS) in response to detecting the channel usage beacon signal during the on-duration;
measuring the DRS;
monitoring a period length from a last successfully received DRS during the on-duration while a DRS is not detected; and
initiating a wake up cycle at the UE to monitor for the DRS, when the period length exceeds a threshold, wherein the wake up cycle corresponds to a periodicity of the DRS.

2. The method of claim 1, further including:
initiating a wake up timer, wherein the UE wakes up from the sleep mode to begin the monitoring for a channel usage beacon signal when the wake up timer is initiated; and
re-entering the sleep mode when the channel usage beacon signal is not detected before expiration of the wake up timer.

3. The method of claim 2, wherein the wake up timer is configured based on configuration signals received from the serving base station.

4. The method of claim 1, wherein the channel usage beacon signal monitoring duration is a lower power process than the on-duration.

5. The method of claim 1, wherein the UE does not perform any data channel or control channel monitoring on the contention-based shared spectrum during the channel usage beacon signal monitoring duration.

6. A method of wireless communication, comprising:
receiving configuration signals, at a user equipment (UE), identifying a first DRX on-duration for a primary carrier and a second DRX on-duration for a secondary carrier that is longer than the first DRX on-duration, wherein a DRX cycle and offset are identical for both the primary carrier and the secondary carrier;
receiving a control signal on a physical layer channel from a primary carrier;
receiving a secondary control signal on the physical layer from the primary carrier;
monitoring the secondary carrier during at least a second timer of one or more timers in response to the secondary control signal, wherein a duration of the at least the second timer of the one or more timers is based on a remaining time of at least one timer of the one or more timers; and
managing the one or more timers for the primary carrier and the secondary carrier using the control signal, wherein the one or more timers are associated with one of:
one or more of the first DRX on-duration or the second DRX on-duration of the primary and secondary carriers, or
entry into a sleep mode of the primary or secondary carriers,
wherein the secondary carrier communicates using a contention-based carrier;
monitoring the primary carrier and the secondary carrier for a discovery reference signal (DRS) during at least one primary carrier timer and at least one secondary carrier timer, wherein the primary carrier includes contention-based shared spectrum;
measuring the DRS in response to detecting the DRS;
monitoring a period length from a last successfully received DRS during the on-duration while a DRS is not detected; and
initiating a wake up cycle at the UE to monitor for the DRS, when the period length exceeds a threshold, wherein the wake up cycle corresponds to a periodicity of the DRS.

7. The method of claim 6, further including:
monitoring the primary carrier, by a user equipment (UE), during a first active time duration based in part on at least one of the one or more timers;
monitoring the secondary carrier, by the UE, during a second active time duration based on the first active time duration; and
entering the sleep mode on the secondary carrier in response to the control signal.

8. The method of claim 7, wherein the at least one of the one or more timers include a discontinuous reception (DRX) on-duration timer and an inactivity timer.

9. The method of claim 7, further including:
stopping the at least one of the one or more timers in response to the control signal.

10. The method of claim 6, the method further comprising:
monitoring the primary carrier, by the UE, during at least one primary carrier timer set to the first DRX on-duration and the secondary carrier during at least one secondary carrier timer set to the second DRX on-duration,
wherein the at least one primary carrier timer is at least one timer of the one or more timers and is associated with the primary carrier, and the at least one secondary carrier timer is at least one timer of the one or more timers and is associated with the secondary carrier.

11. The method of claim 10, wherein the monitoring the secondary carrier occurs during each of:
one or more downlink subframes identified in an uplink-downlink configuration communicated in a system broadcast message; and
one or more downlink subframes in a dynamic uplink-downlink configuration signal.

12. The method of claim 11, further including:
entering a sleep mode at the UE for the secondary carrier in response to the control signal.

13. The method of claim 12, further including:
receiving a secondary downlink control channel on the secondary carrier during the at least one secondary carrier timer of the one or more timers;
starting an inactivity timer of the one or more timers for the secondary carrier in response to the secondary downlink control channel; and
extending monitoring for a next secondary downlink control channel on the secondary carrier during the inactivity timer, wherein the control signal is received during the inactivity timer.

14. The method of claim 10, wherein the at least one secondary carrier timer overlaps with the at least one primary carrier timer of the one or more timers, the method further including:
receiving a downlink control channel over the primary carrier, wherein the downlink control channel includes at least an uplink grant for uplink transmission on the secondary carrier.

15. An apparatus configured for wireless communication, the apparatus comprising:
at least one processor; and
a memory coupled to the at least one processor,
wherein the at least one processor is configured:
to monitor for a channel usage beacon signal, by a user equipment (UE), transmitted by a serving base station on a channel to reserve the channel in response to a successful clear channel assessment (CCA) of the channel according to a listen before talk (LBT) procedure, on contention-based shared spectrum during channel usage beacon signal monitoring duration;

initiating an on-duration in response to detection of the channel usage beacon signal, wherein the on-duration comprises to monitor for a downlink control channel on the contention-based shared spectrum during the on-duration based on a configured on-duration timer;

to enter a sleep mode on expiration of one of:
an inactivity timer, wherein the inactivity timer is initiated in response to detecting the downlink control channel, or
the configured on-duration timer;

to monitor for a discovery reference signal (DRS) in response to detecting the channel usage beacon signal during the on-duration;

to measure the DRS;

to monitor a period length from a last successfully received DRS during the on-duration while a DRS is not detected; and to initiate a wake up cycle at the UE to monitor for the DRS, when the period length exceeds a threshold, wherein the wake up cycle corresponds to a periodicity of the DRS.

16. The apparatus of claim 15, further including configuration of the at least one processor:
to initiate a wake up timer, wherein the UE wakes up from the sleep mode to begin the monitoring for a channel usage beacon signal when the wake up timer is initiated; and
to re-enter the sleep mode when the channel usage beacon signal is not detected before expiration of the wake up timer.

17. An apparatus configured for wireless communication, the apparatus comprising:
at least one processor; and
a memory coupled to the at least one processor,
wherein the at least one processor is configured:
to receive configuration signals identifying a first DRX on-duration for a primary carrier and a second DRX on-duration for a secondary carrier that is longer than the first DRX on-duration, wherein a DRX cycle and offset are identical for both the primary carrier and the secondary carrier;
to receive a control signal on a physical layer channel from the primary carrier;
to receive a secondary control signal on the physical layer from the primary carrier;
to monitor the secondary carrier during at least a second timer of one or more timers in response to the secondary control signal, wherein a duration of the at least the second timer of the one or more timers is based on a remaining time of at least one timer of the one or more timers; and
to manage the one or more timers for the primary carrier and the secondary carrier using the control signal, wherein the one or more timers are associated with one of:
one or more of the first DRX on-duration or the second DRX on-duration of the primary and secondary carriers, or
entry into a sleep mode of the primary or secondary carriers,
wherein the secondary carrier communicates using a contention-based carrier;
to monitor the primary carrier and the secondary carrier for a discovery reference signal (DRS) during at least one primary carrier timer and at least one secondary carrier timer, wherein the primary carrier includes contention-based shared spectrum;
to measure the DRS in response to detecting the DRS;
to monitor a period length from a last successfully received DRS during the on-duration while a DRS is not detected; and
to initiate a wake up cycle to monitor for the DRS, when the period length exceeds a threshold, wherein the wake up cycle corresponds to a periodicity of the DRS.

18. The apparatus of claim 17, further including configuration of the at least one processor:
to monitor the primary carrier, by a user equipment (UE), during a first active time duration based in part on at least one of the one or more timers;
to monitor the secondary carrier, by the UE, during a second active time duration based on the first active time duration; and
to enter the sleep mode on the secondary carrier in response to the control signal.

19. The apparatus of claim 18, wherein the at least one of the one or more timers include a discontinuous reception (DRX) on-duration timer and an inactivity timer.

20. The apparatus of claim 17, the apparatus further including configuration of the at least one processor:
to monitor the primary carrier, by the UE, during at least one primary carrier timer set to the first DRX on-duration and the secondary carrier during at least one secondary carrier timer set to the second DRX on-duration,
wherein the at least one primary carrier timer is at least one timer of the one or more timers and is associated with the primary carrier, and the at least one secondary carrier timer is at least one timer of the one or more timers and is associated with the secondary carrier.

21. The apparatus of claim 20, wherein the configuration of the at least one processor to monitor the secondary carrier occurs during each of:
one or more downlink subframes identified in an uplink-downlink configuration communicated in a system broadcast message; and
one or more downlink subframes in a dynamic uplink-downlink configuration signal.

22. The apparatus of claim 21, further including configuration of the at least one processor to enter a sleep mode at the UE for the secondary carrier in response to the control signal.

23. The apparatus of claim 22, further including configuration of the at least one processor:
to receive a secondary downlink control channel on the secondary carrier during the at least one secondary carrier timer of the one or more timers;
to start an inactivity timer of the one or more timers for the secondary carrier in response to the secondary downlink control channel; and
to extend monitoring for a next secondary downlink control channel on the secondary carrier during the inactivity timer, wherein the control signal is received during the inactivity timer.

24. The apparatus of claim 20, wherein the at least one secondary carrier timer overlaps with the at least one primary carrier timer of the one or more timers, the apparatus further including configuration of the at least one processor to receive a downlink control channel over the primary carrier, wherein the downlink control channel includes at least an uplink grant for uplink transmission on the secondary carrier.

* * * * *